(12) United States Patent
Yang

(10) Patent No.: US 11,016,785 B2
(45) Date of Patent: May 25, 2021

(54) METHOD AND SYSTEM FOR MIRROR IMAGE PACKAGE PREPARATION AND APPLICATION OPERATION

(71) Applicants: Zheng Yang, Huangshi (CN); Cong Lu, Huangshi (CN)

(72) Inventor: Zheng Yang, Huangshi (CN)

(73) Assignees: Zheng Yang, Huangshi (CN); Cong Lu, Huangshi (CN)

( * ) Notice: Subject to any disclaimer, the term of this patent is extended or adjusted under 35 U.S.C. 154(b) by 148 days.

(21) Appl. No.: 16/462,558

(22) PCT Filed: Mar. 30, 2017

(86) PCT No.: PCT/CN2017/078723
§ 371 (c)(1),
(2) Date: Oct. 21, 2019

(87) PCT Pub. No.: WO2018/090529
PCT Pub. Date: May 24, 2018

(65) Prior Publication Data
US 2020/0057654 A1 Feb. 20, 2020

(30) Foreign Application Priority Data

Nov. 21, 2016 (CN) .......................... 201611042938.5

(51) Int. Cl.
*G06F 9/445* (2018.01)
*G06F 8/65* (2018.01)
(Continued)

(52) U.S. Cl.
CPC ................ *G06F 9/445* (2013.01); *G06F 8/61* (2013.01); *G06F 8/65* (2013.01); *G06F 16/172* (2019.01)

(58) Field of Classification Search
CPC ..... G06F 8/60–71; G06F 9/445; G06F 16/172
(Continued)

(56) References Cited

U.S. PATENT DOCUMENTS 5,287,507 A * 2/1994 Hamilton ............ G06F 12/0875
709/203
6,983,315 B1 * 1/2006 Crutcher ................. H04L 67/02
709/220
(Continued)

FOREIGN PATENT DOCUMENTS

CN 102135892 A 7/2011
CN 104111804 A 10/2014
(Continued)

OTHER PUBLICATIONS

Tyndall, J., Building an Effective Software Deployment Process, SIGUCCS '12: Proceedings of the 40th annual ACM SIGUCCS conference on User services, Oct. 2012, pp. 109-114, [retrieved on Feb. 12, 2021], Retrieved from the Internet: <URL:http://dl.acm.org/>.*

(Continued)

*Primary Examiner* — Geoffrey R St Leger
(74) *Attorney, Agent, or Firm* — Bayramoglu Law Offices LLC

(57) ABSTRACT

A method for mirror image package preparation and application operation includes: acquiring a launch operation package and launch mirror image package; upon launching of the target application, establishing a first channel between a local buffer manager and the launch mirror image package, and a second channel between the local buffer manager and a server; creating a first virtual file system locally, and establishing a third channel between the local buffer manager and the first virtual file system; if a received file access request is a read request, acquiring first data from the launch mirror image package, and/or from an original mirror image
(Continued)

package on the server; feeding the first data back to the target application, wherein storage directory structures of data sets in the launch mirror image package and original mirror image package individually correspond to logic directory relations of file sets in an original data package.

25 Claims, 9 Drawing Sheets

(51) Int. Cl.
    *G06F 8/61*           (2018.01)
    *G06F 16/172*       (2019.01)

(58) Field of Classification Search
    USPC .................................................. 717/168–178
    See application file for complete search history.

(56) References Cited

U.S. PATENT DOCUMENTS

| | | | | |
|---|---|---|---|---|
| 7,865,468 | B2* | 1/2011 | Naineni | G06F 16/172 |
| | | | | 707/636 |
| 8,533,151 | B2* | 9/2013 | McDiarmid | G06F 16/284 |
| | | | | 707/602 |
| 8,930,940 | B2* | 1/2015 | Xu | G06F 8/60 |
| | | | | 717/175 |
| 10,048,954 | B2* | 8/2018 | Ahmed | G06F 8/4442 |
| 10,120,660 | B2* | 11/2018 | Chen | G06F 9/451 |
| 2004/0039934 | A1* | 2/2004 | Land | G11B 27/034 |
| | | | | 726/26 |
| 2009/0222453 | A1* | 9/2009 | Naineni | G06F 16/172 |
| 2010/0306270 | A1* | 12/2010 | McDiarmid | G06F 16/284 |
| | | | | 707/796 |
| 2013/0047149 | A1* | 2/2013 | Xu | G06F 21/53 |
| | | | | 717/175 |
| 2018/0081652 | A1* | 3/2018 | Ahmed | G06F 16/9024 |
| 2018/0225098 | A1* | 8/2018 | Chen | G06F 8/41 |

FOREIGN PATENT DOCUMENTS

| | | |
|---|---|---|
| CN | 104391719 A | 3/2015 |
| CN | 105320578 A | 2/2016 |
| CN | 105988809 A | 10/2016 |
| WO | 2012146985 A2 | 11/2012 |

OTHER PUBLICATIONS

Tian, H., et al., A Novel Software Deployment Method based on Installation Packages, 2010 Fifth Annual ChinaGrid Conference, Jul. 16-18, 2010, 6 pages, [retrieved on Feb. 12, 2021], Retrieved from the Internet: <URL:http://ieeexplore.ieee.org/>.*

* cited by examiner

401 — Establishing a local manager and establishing an eleventh channel between the local manager and a data set in an original image package when a target application is launched 402 — Copying the data set in the original image package into a launch image package in accordance with a storage directory structure of the data set in the original image package, determining the data set in the launch image package as a basic data set, and establishing a twelfth channel between the local manager and the basic data set, wherein the image files of the basic data set is empty 403 — Locally creating a third virtual file system and establishing a thirteenth channel between the local manager and the third virtual file system 404 — The local manager receiving a file access request via the thirteenth channel, wherein the file access request is received by the third virtual file system from the target application 405 — Invoking, when the file access request is a read request, the local manager to acquire fourth data corresponding to the read request from the original image package via the eleventh channel; and writing the fourth data into the image file of the basic data set via the twelfth channel; and stopping writing the fourth data into the image file of the basic data set when the target application stops running

FIG. 4A

METHOD AND SYSTEM FOR MIRROR IMAGE PACKAGE PREPARATION AND APPLICATION OPERATION

CROSS REFERENCE TO THE RELATED APPLICATIONS

This application is the national phase entry of International Application No. PCT/CN2017/078723, filed on Mar. 30, 2017, which is based upon and claims priority to Chinese Patent Application No. 201611042938.5, filed on Nov. 21, 2016, the entire contents of which are incorporated herein by reference.

TECHNICAL FIELD

The present disclosure relates to the technical field of information processing, and in particular to a method and a system for generating (preparing) original image package of an application, a method and a system for generating a launch (starting) image package of an application, and a method and a system for running an application.

BACKGROUND

With the continuous development of computer technology, the functions of various applications are continuously enriched and improved, such as various functions displayed on the toolbar of photo editing software (Photoshop, PS), the addition of levels of various game software, etc.; and in order to enhance the visual effects in some applications, all the screens in the applications are rendered into three-dimensional (3D) effects, such as 3D games. Applications such as virtual reality have higher and higher requirements for occupation of various computing resources, for example, the processing capability of a central processing unit (CPU) required in artificial intelligence, mathematical calculations, or the like, the processing capability of a graphics processing unit required in graphic operations, and the storage space required by pictures, character models, map models, and large-scale databases, all of which result in increasingly complicated functions of the applications and larger and larger data packages (packets).

When using an application program for the first time, a user needs to download a complete software installation package and/or data package of the application from a sever and the user needs to install the software installation package of the application on an terminal before launching the application, as a result, the procedure of downloading the data package and installing the software installation package often takes quite a long time. In order to solve this problem, in some companies, executable programs and resource data are currently managed separately depending on the characteristics of their own applications, and the resource data such as pictures, models, built-in videos and so on are split and modularly processed generally according to the majority of quotas occupying the program package size, and the necessary executable programs and resource module data are packaged to generate a micro client.

During splitting of an application, (1) it is often necessary to analyze executable files that need to be loaded for initial running (operation) of a program, and resource files on which the executable files are dependent. (2) It is often necessary to analyze the dependency relations between multiple executable files, and the resources on which all the executable files are dependent simultaneously, for example, analyze which resources are to be triggered or which program is to be invoked by a certain functional interface. (3) Some large programs are dependent on many third-party program libraries, or system functional components, such as 3D graphics engine, a data transmission library, an video image compression/decompression library, local operating system hardware—CPU, graphics card, magnetic disk, network management interfaces, etc., and these components generally have very complicated internal structures and a lot of background knowledge are required for understanding of relevant details thereof. Therefore, a lot of learning tasks are required for parsing of third-party libraries to understand the ways and characteristics of accessing resources when the third-party libraries are running. However, a lot of problems in compatibility and performance are often caused due to incomplete understanding of relevant mechanisms, and it takes time and labor to handle the problems; thus, it can be seen that the above-mentioned operation of splitting an application is relatively complicated, and a large amount of additional labor cost and time cost is to be introduced.

SUMMARY

The technical problem to be solved by embodiments of the present disclosure is to provide a method for running an application, a method for generating an original (mirror) image package of an application, and a method for generating a launch image package of an application, to solve the problems of low efficiency and high cost caused by splitting an application to generate a micro client in the prior art.

Correspondingly, the embodiments of the present disclosure further provide systems corresponding to the above methods, which are respectively: a system for running an application, a system for generating an original image package of an application, and a system for generating a launch image package of an application, respectively, for ensuring the implementation and application of the above methods.

An embodiment of the present disclosure discloses a method for running an application, specifically comprising: acquiring, in a case where a target application is not installed, a launch running (operation) package and a launch image package of a target application in advance, wherein the launch running package is configured to launch the target application, and the launch image package includes launch data about the target application; establishing, in a case where the target application is launched by means of the launch running package, a local cache manager, and establishing a first channel(s) between the local cache manager and the launch image package, and establishing a second channel(s) between the local cache manager and a server; locally creating a first virtual file system, and establishing a third channel between the local cache manager and the first virtual file system; the local cache manager receiving a file access request via the third channel, wherein the file access request is received by the first virtual file system from the target application; the local cache manager acquiring, in a case where the file access request is a read request, first data for the read request from the launch image package via the first channel; and/or the local cache manager acquiring the first data for the read request from an original image package on the server via the second channel; wherein the original image package includes launch data and running data about the target application; and feeding back the first data to the target application via the third channel to cause the target application to run; wherein storage directory structures of data sets in the launch image package and the original image package correspond to logic directory relations (structures) of files in an original data package of the target application, respectively; the first channel respectively corresponds to each data set in the launch image package; and the second channel respectively corresponds to each data set in the original image package.

Correspondingly, an embodiment of the present disclosure further discloses a system for running an application, specifically comprising: a data package acquiring module configured to acquire a launch running package and a launch image package of a target application in advance in a case where the target application is not installed, wherein the launch running package is configured to launch the target application, and the launch image package includes launch data about the target application; a local cache manager establishing module configured to establish a local cache manager, establish a first channel between the local cache manager and the launch image package, and establish a second channel between the local cache manager and a server in a case where the target application is launched by the launch running package; a first virtual file system establishing module which locally creates a first virtual file system, and establishes a third channel between the local cache manager and the first virtual file system; a first file access request receiving module configured to invoke the local cache manager to receive a file access request via the third channel, where the file access request is received by the first virtual file system from the target application; a data acquiring module configured to: invoke, in a case where the file access request is a read request, the local cache manager to acquire first data for the read request from the launch image package via the first channel; and/or invoke the local cache manager to acquire first data for the read request from an original image package on the server via the second channel; wherein the original image package includes launch data and running data about the target application; and a data feedback module configured to feed back the first data to the target application via the third channel to cause the target application to run; wherein storage directory structures of data sets in the launch image package and the original image package correspond to logic directory relations of files in an original data package of the target application, respectively; the first channel respectively corresponds to each data set in the launch image package; and the second channel respectively corresponds to each data set in the original image package.

An embodiment of the present disclosure discloses a method for generating an original image package of an application, specifically comprising: establishing a data package generation manager and creating an empty original image package; locally creating a second virtual file system is configured to receive a file creation request, and creating a ninth channel(s) between the second virtual file system and the data package generation manager; the data package generation manager acquiring the file creation request via the ninth channel, and creating, in accordance with the logic directory relation of the file in an original data package corresponding to the file creation request, a corresponding data set in the original image package; and establishing a tenth channel(s) between the data package generation manager and the data set in the original image package; and the data package generation manager receiving a write request via the ninth channel, and writing third data corresponding to the write request into the data set of the original image package via the tenth channel, wherein the third data is contained in an original data package of a target application; and the ninth channel and the tenth channel are corresponding to each data set in the original image package, respectively.

Correspondingly, the present disclosure further discloses a system for generating an original image package of an application, specifically comprising: a data package generation manager establishing module configured to establish a data package generation manager and create an empty original image package; a second virtual file system establishing module configured to locally create a second virtual file system is configured to receives a file creation request, and create a ninth channel between the second virtual file system and the data package generation manager; an original image package data set creating module configured to: acquire the file creation request by the data package generation manager via the ninth channel, and create a corresponding data set in the original image package in accordance with the logic directory relation of the file in an original data package corresponding to the file creation request; and establish a tenth channel between the data package generation manager and the data set in the original image package; and an original image package data writing module configured to invoke the data package generation manager to receive a write request via the ninth channel, and write third data corresponding to the write request into the data set of the original image package via the tenth channel, wherein the third data is data contained in an original data package of a target application; and the ninth channel and the tenth channel are corresponding to each data set in the original image package, respectively.

An embodiment of the present disclosure discloses a method for generating a launch image package of an application, specifically comprising: establishing, when a target application is launched, a local manager and establishing an eleventh channel(s) between the local manager and a data set(s) in an original image package; copying, in accordance with a storage directory structure of the data set in the original image package, the data set in the original image package into a launch image package, determining a data set(s) in the launch image package as a basic data set(s), and establishing a twelfth channel(s) between the local manager and the basic data set(s), wherein the image files of the basic data sets are empty; locally creating a third virtual file system and establishing a thirteenth channel between the local manager and the third virtual file system; the local manager receiving a file access request via the thirteenth channel, wherein the file access request is received by the third virtual file system from the target application; and the local manager acquiring, in a case where the file access request is a read request, fourth data corresponding to the read request from the original image package via the eleventh channel; and writing the fourth data into the image file of the basic data set via the twelfth channel; and stopping writing the fourth data into the image files of the basic data sets when the target application stops running; wherein the twelfth channel respectively corresponds to each basic data set in the launch image package; and the eleventh channel respectively corresponds to each data set in the original image package.

Correspondingly, an embodiment of the present disclosure further discloses a system for generating a launch image package of an application, specifically comprising: a local manager establishing module configured to establish a local manager and establish an eleventh channel(s) between the local manager and a data set(s) in an original image package when a target application is launched; a launch image package data set copying module configured to copy the data set in the original image package into a launch image package in accordance with a storage directory structure of the data set in the original image package, determine the data set(s) in the launch image package as a basic data set(s), and establish a twelfth channel(s) between the local manager and the basic data set(s), wherein the image files of the basic data sets are empty; a third virtual file system establishing module configured to locally create a third virtual file system and establish a thirteenth channel between the local manager and the third virtual file system; a second file access request receiving module configured to invoke the local manager to receive a file access request via the thirteenth channel, wherein the file access request is received by the third virtual file system from the target application; and a launch image package data writing module configured to invoke, in a case where the file access request is a read request, the local manager to acquire fourth data corresponding to the read request from the original image package via the eleventh channel; and to write the fourth data into the image files of the basic data sets via the twelfth channel; and to stop writing the fourth data into the image files of the basic data sets when the target application stops running; wherein the twelfth channel respectively corresponds to each basic data set in the launch image package; and the eleventh channel respectively corresponds to each data set in the original image package.

Compared to the prior art, advantages of the embodiments of the present disclosure include the following:

In embodiments of the present disclosure, during generation of an original image package, after a second virtual file system is established locally, and a data package generation manager is established and an empty original image package is created, when the data package generation manager receives a file creation request, a corresponding data set is created in the original image package in accordance with a logic directory relation corresponding to a file in the original data package corresponding to the file creation request; then a corresponding write request is received, and data corresponding to the write request is written into the data set in the original image package; thus, all the data of the files in the original data package can be copied into the corresponding data sets of the original image package in accordance with the above steps; in addition, in the embodiment of the present disclosure, when a launch image package is established, a corresponding basic data set is established in accordance with the storage directory structure of the data set of the original image package, and launch data about the target application in the original image package is copied into the corresponding basic data set of the launch image package; therefore the original image package and the launch image package can be made in accordance with the logic directory relation of the files of the original data package of the target application, and in the generation of both the original image package, the resolution of a running environment on which the application is dependent and the tasks of modularized splitting can be omitted, which greatly reduces labor cost and time cost.

Further, when the user uses a target application for the first time, a launch running package and a launch image package of the target application are acquired; and then in a case where the application is launched by means of the launch running package, the local cache manager acquires a file access request via the established third channel; in a case where the file access request is a read request, the local cache manager acquires first data for the read request from the launch image package via the first channel; and/or the local cache manager acquires first data for the read request from an original image package on the server via the second channel; and the first data is fed back to the target application via the third channel to cause the target application to run; thus, in the case where only the launch running package and the launch image package are acquired, data required by the target application is enabled to be acquired from the launch image package and/or from the original image package on the server during the running of the target application to ensure the normal running of the target application. In addition, since the launch image package contains the launch data about the target application, which is much smaller than original data about the target application, the time required for the user to launch the target application for the first time is greatly shortened, and the user experience is enhanced. In addition, while the target application is running for a long time, in general not all functions will be used, thus only part of the program data will be downloaded, so that the occupied space of the storage system of the user's local device will be greatly reduced. Moreover, since different types of files are stored in different types of data sets in the original data package and the launch image package of the target application, different types of data can be optimally transmitted via channels corresponding to the data during the running of the target application, for example, the transmission order is adjusted in accordance with weight priority and different compression algorithms are used to increase the data transmission efficiency and enhance the response speed of the target application in a relatively harsh network environment, thereby greatly increasing the smoothness of running of the target application and improving the adaptability to a harsh environment.

BRIEF DESCRIPTION OF THE DRAWINGS

FIG. 4A is a flow chart showing the steps of an embodiment of a method for generating a launch image package of an application according to the present disclosure;

DETAILED DESCRIPTION OF THE EMBODIMENTS

Figure 1:
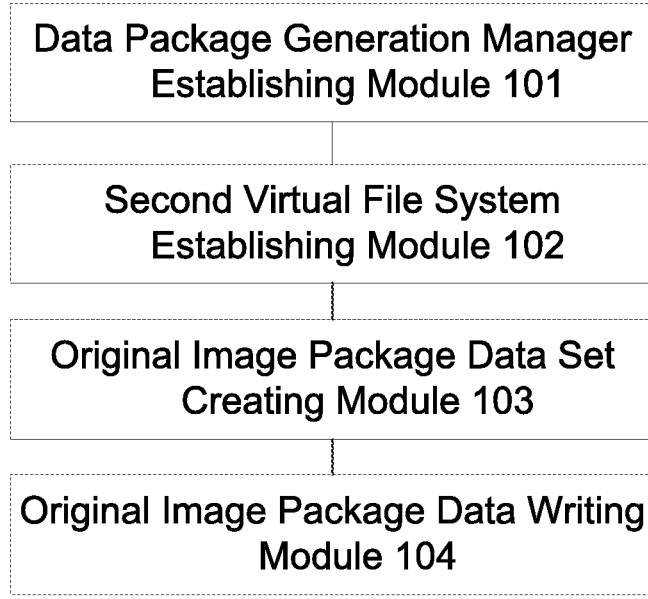
FIG. 1 is a structural block diagram of an embodiment of a system for generating an original image package of an application according to the present disclosure.

The present disclosure will be described in further detail in the following with reference to the accompanying drawings and detailed embodiments in order to enable clearer and easier understanding of the above objects, features, and advantages of the present disclosure.

The embodiments of the present disclosure may be applied to various operating systems of a terminal, wherein the terminal includes a personal computer (PC) or a mobile terminal, and the operating system includes an PC operating system such as Windows, Linux, Unix, a virtual machine simulation system or the like, and also includes an operating system of the mobile terminal such as Android, IOS, or the like.

A target application in the embodiments of the present disclosure refers to an application having a relatively large software installation package and/or data package, such as an application e.g. 3D game, PS or the like; wherein the target application may be a PC application, or may be an application (APP) of a mobile terminal. Methods and systems of the embodiments of the present disclosure will be described below by taking the mobile terminal as an example.

An embodiment of the present disclosure provides a system for running an application, which is configured to: acquire, after acquiring a launch running package and a launch image package corresponding to a target application, data required by the target application from the launch image package and/or an original image package on a server when the target application is running, so that the target application may run normally; therefore, it is necessary to generate the launch image package and the original image package of the target application in advance to ensure the normal running of the target application; thus an embodiment of the present disclosure further provides a method and a system for generating an original image package of an application, which are configured to generate an original image package of a target application, and a method and a system for generating a launch image package of an application, which are configured to generate a launch image package of a target application. The above three systems and their corresponding methods will be described in detail below.

In order to better describe the following embodiments, data sets and files in the embodiments of the present disclosure are first explained and described. In an original data package of a target application, data is displayed in form of a file (directory/normal file), that is to say, the original data package comprises: a directory file whose content is a directory structure (directory entries) of files; and a data file whose content is data for supporting the launching and running of the target application, wherein data including each type is corresponding to a respective data file; wherein the files in the original data package are referred to as files (file sets), one directory file or one type of data file is referred to as one file (set), and the files in the original data package are stored in a tree directory structure. All the files in the original image package and the launch image package are referred to as data sets, a directory file and files including various different types of data are referred to as a data set, and the data sets in the original image package and the launch image package are stored in a hierarchically expanded directory structure. In order to distinguish the directory structures in the original data package and the image package (including the original image package and the launch image package), the directory storage structure in the original data package is referred to as a logic directory relation, and the structure in the image package is referred to as a storage directory structure; wherein there is a mapping relation between the data sets and the files.

Referring to FIG. 1 which illustrates a structural block diagram of an embodiment of a system for generating an original image package of an application according to the present disclosure, the system may specifically comprise: a data package generation manager establishing module 101, a second virtual file system establishing module 102, an original image package data set creating module 103, and an original image package data writing module 104, wherein the data package generation manager establishing module 101 is configured to establish a data package generation manager and create an empty original image package.

The second virtual file system establishing module 102 is configured to locally create a second virtual file system which receives a file creation request, and create a ninth channel between the second virtual file system and the data package generation manager.

The original image package data set creating module 103 is configured to: acquire the file creation request by the data package generation manager via the ninth channel, and create, in accordance with a logic directory relation of a file in an original data package corresponding to the file creation request, a corresponding data set(s) in the original image package; and establish a tenth channel between the data package generation manager and each data set in the original image package.

The original image package data writing module 104 is configured to invoke the data package generation manager to receive a write request via the ninth channel, and write third data corresponding to the write request into the data set of the original image package via the tenth channel, wherein the third data is contained in an original data package of a target application; and the ninth channel and the tenth channel are corresponding to each data set in the original image package, respectively.

In an embodiment of the present disclosure, the second virtual file system establishing module 102 is deployed in a mobile terminal, and the data package generation manager establishing module 101, the original image package data set creating module 103, and the original image package data writing module 104 may be all deployed in the mobile terminal, or may be all deployed on a server, wherein the target application and the original data package of the target application are already installed in the mobile terminal, and the target application can run normally in the mobile terminal, for example an APP of game A is installed in the mobile terminal. In addition, in a system for generating an original image package of an application according to an embodiment of the present disclosure, the mobile terminal includes a corresponding control panel, and after the control panel is activated, a corresponding control module is controlled to launch a corresponding process to control the above-mentioned four modules. When an operation performed by a user on the control panel in the mobile terminal is received, the control module acquires configuration information on the target application in the mobile terminal, wherein the configuration information includes: content description information such as the name of the target application, the size of the original data package, and the like; and a process for generating an original image package of the application is launched, and after the process is launched, the data package generation manager establishing module 101 establishes a data package generation manager; the control module sends the acquired configuration information to the data package generation manager, and the data package generation manager creates an empty original image package based on the configuration information, wherein the capacity of the original image package is greater than the capacity of the original data package of the target application, and for example, if the original data package of the game A has a capacity of 4 GB, the original image package of the game A may have a capacity of 4.2 GB; and a configuration file with a format already set is included in the created empty original image package, and the data package generation manager adds the configuration information on the target application into the configuration file.

Then, the control module launches a file system creation process, a second virtual file system is created in the mobile terminal by the second virtual file system establishing module 102, and the operating system is notified via an application programming interface (API) of the system to recognize the created second virtual file system; wherein different operating systems may recognize the virtual file system by different procedures, and the method of recognizing the virtual file system by the operating system is not limited in the embodiments of the present disclosure. After the operating system recognizes the virtual file system, a mount point such as/apps/app id is created for the second virtual file system, and at this time the second virtual file system can be accessed. When the second virtual file system receives a file creation request from the target application, the second virtual file system establishing module 102 creates, in accordance with a logic directory relation of a file in the original data package corresponding to the file creation request, a file corresponding to the file creation request in the second virtual file system, and creates a ninth channel between the file currently established in the second virtual file system and the data package generation manager; wherein the file created in the second virtual file system has the same directory structure as the logic directory relation of the file in the original data package; for the target application, both the file in the second virtual file system and the file in the original data package have visible directory and file expansion effects. The second virtual file system establishes a corresponding ninth channel for each file currently created respectively. Here, one or more files may be created each time based on the file creation request.

After the establishment of the ninth channel is completed, the second virtual file system sends the file creation request to the data package generation manager via the ninth channel; the original image package data set creating module 103 invokes the data package generation manager to receive the file creation request; after receiving the file creation request, the data package generation manager determines a logic directory relation corresponding to a file in the original data package of the target application that is corresponding to the file creation request; and then the original image package data set creating module creates, in accordance with a mapping relation between the logic directory relation and a storage directory structure, a corresponding data set in the original image package, wherein the specific steps of creating the data set will be discussed in detail later; and the original image package data set creating module establishes a tenth channel between the data set currently created and the data package generation manager; wherein each data set currently created is corresponding to a tenth channel. After the creation of the tenth channel is completed, the control module launches a data copy process, so that data in the original data package is written into the data set corresponding to the original image package via the ninth channel and the tenth channel; specifically, the original image package data writing module 104 invokes the data package generation manager to receive a write request via the ninth channel, and then invokes the data package generation manager based on the acquired write request to write third data corresponding to the write request via the tenth channel into the data set created in the original image package described above; during writing of the original data package into the original image package, for each file creation request, according to the logic directory relation of the file in the original data package that is corresponding to the file creation request, a file is created in the second virtual file system and a corresponding data set is created in the original image package; and third data corresponding to the write request is written into the corresponding data set based on the write request subsequent to each file creation request; thus, all the data in the original data package can be copied into the data set(s) of the original image package.

The generation of the original image package is completed as above. If the data package generation manager establishing module 101, the original image package data set creating module 103, and the original image package data writing module 104 are all deployed on the server, the data of the original data package of the target application in the mobile terminal is copied into the original image package on the server; if the data package generation manager establishing module 101, the original image package data set creating module 103, and the original image package data writing module 104 are all deployed on the mobile terminal, the already made original image package can be uploaded to the server so as to be conveniently used by different users when running the target application.

Figure 2A:
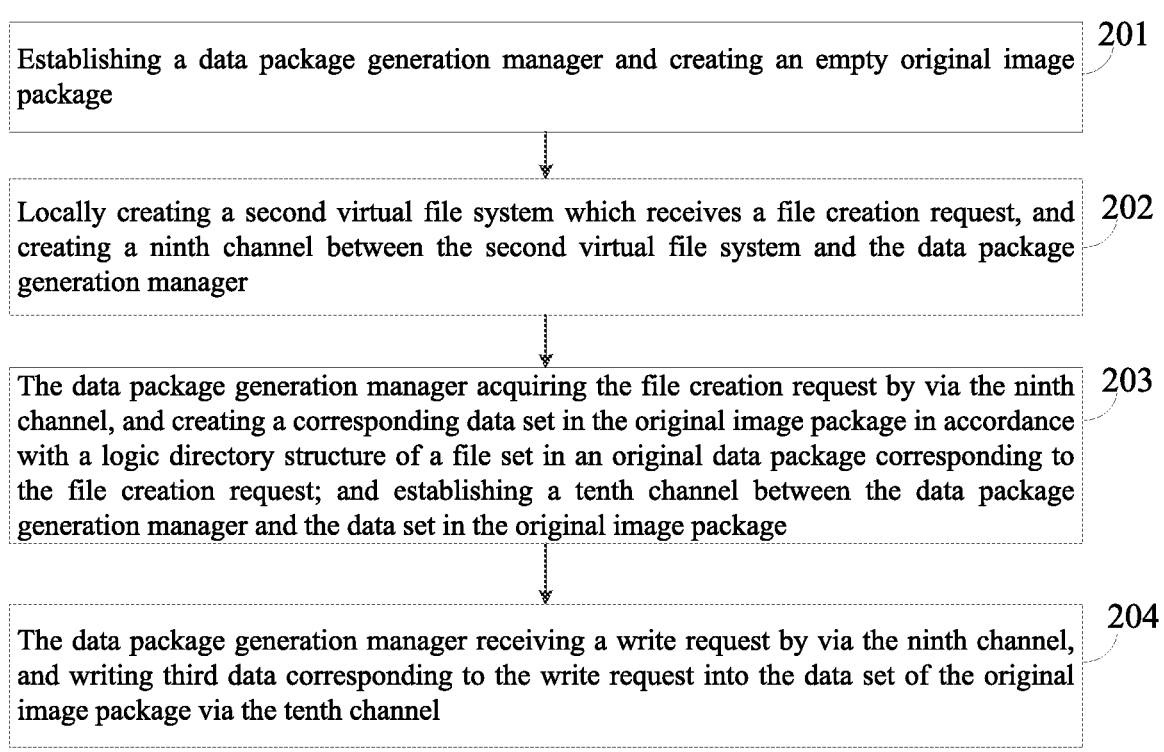
FIG. 2A is a flow chart showing the steps of an embodiment of a method for generating an original image package of an application according to the present disclosure.
Figure 2B:
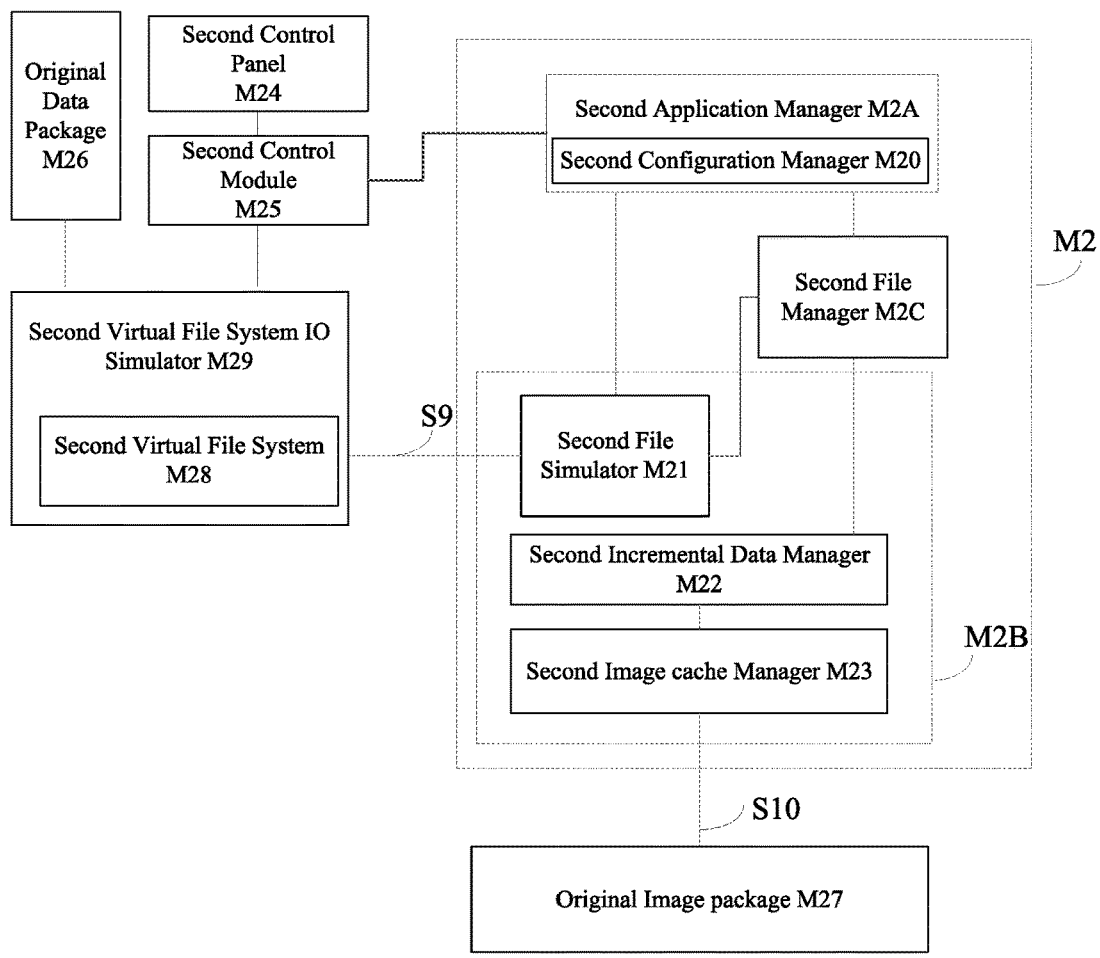
FIG. 2B is a structural block diagram of another embodiment of a system for generating an original image package of an application according to the present disclosure.

In another embodiment of the present disclosure, a method corresponding to the system for generating an original image package of an application is described with particular reference to FIGS. 2A and 2B, wherein FIG. 2A illustrates a flow chart of the steps of an embodiment of a method for generating an original image package of an application according to the present disclosure; and FIG. 2B illustrates a structural block diagram of another embodiment of a system for generating an original image package of an application according to the present disclosure.

The data package generation manager M2 in embodiments of the present disclosure may comprise: a second application manager M2A, a second storage stack M2B, and a second file manager M2C, wherein the second application manager M2A may comprise a second configuration manager M20; the second storage stack M2B may comprise: a second file simulator M21, a second incremental data manager M22, and a second image (mirror) cache manager M23. The specific steps of generating an original image package are described in detail by taking the managers and the storage stack included in the data package generation manager M2 described above as an example.

Step 201: establishing a data package generation manager and creating an empty original image package.

The size of the original image package and the configuration information on the data are determined based on the original data package of the target application; therefore, in a mobile terminal in which the target application is already installed, a second control panel M24 is activated based on an operation performed by a user, and a second control module M25 scans the original data package M26 of the target application of the mobile terminal by launching a configuration information acquisition process to acquire configuration information on the original data package M26 of the target application, wherein the configuration information includes: content description information such as the name of the target application, the size of the original data package, and the like. Meanwhile, the second control module M25 may also launch a process of generating an original image package of the application, and invoke the data package generation manager establishing module 101 to establish a data package generation manager M2. Specifically, the data package generation manager establishing module 101 activates the second application manager M2A, and establishes the second file manager M2C, the second file simulator M21, the second incremental data manager M22, and the second image cache manager M23; at this time, the second configuration manager M20 in the second application manager M2A is also activated, wherein the second file manager M2C is configured to manage operations such as opening and closing of data sets in the original image package, reading and writing of data from/into data sets, and creation and deletion of data sets. After the establishment of the data package generation manager M2 is completed, the second application manager M2A acquires configuration information corresponding to the target application, and saves the acquired configuration information in the second configuration manager M20; and then the second application manager creates an empty original image package M27 based on the configuration information, where the capacity of the original image package M27 is greater than the capacity of the original data package M26; wherein an empty configuration file with a format already set is included in the empty original image package M27; and then second application manager invokes the second configuration manager M20 to add the configuration information corresponding to the target application to the empty configuration file with a format already set.

Step 202: creating locally a second virtual file system which is configured to receive a file creation request, and creating a ninth channel between the second virtual file system and the data package generation manager.

After the establishment of the data package generation manager M2 and the original image package M27 is completed, the second control module M25 launches a file system creation process, a second virtual file system M28 is created in the mobile terminal by the second virtual file system establishing module 102, and then the operating system of the mobile terminal creates a mount point for the second virtual file system, and processes in the operating system can access the second virtual file system M28 via the mount point. The operating system has a second virtual file system IO simulator M29 corresponding to the second virtual file system, for recognizing an operation of accessing a file of the second virtual file system M28. After the second virtual file system M28 can be recognized by the operating system, the second control module M25 launches a data copy process to copy the data in the original data package M26 of the target application into the original image package M27; specifically, after a copy process is launched, the copy process sends a file creation request to the second virtual file system M28, the second virtual file system M28 determines, after receiving the file creation request, a logic directory relation of a file in the original data package M26 that is corresponding to the file creation request, and creates a corresponding file in the second virtual file system M28.

Figure 2C:
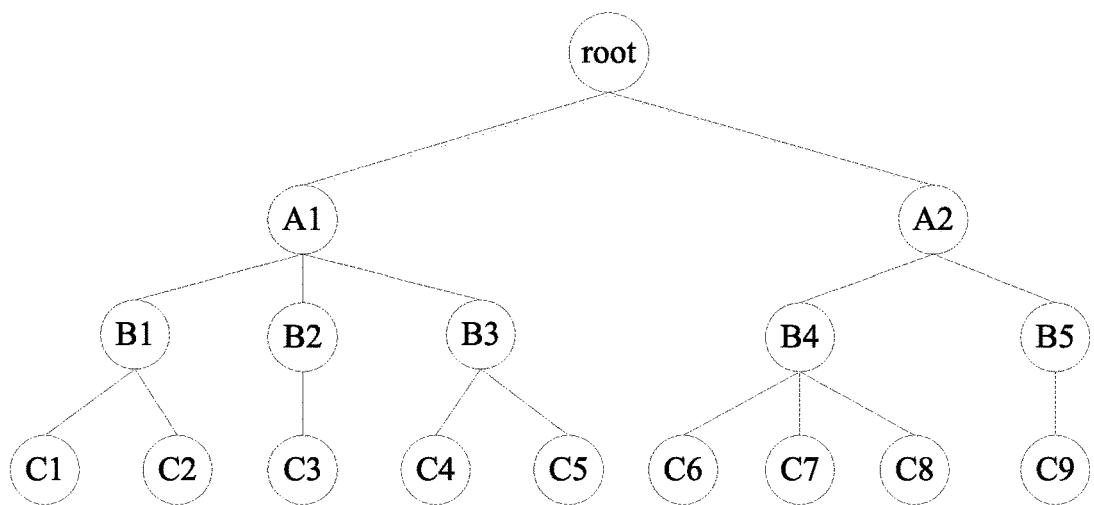
FIG. 2C is a schematic diagram showing a file presentation form in an original data package of a target application according to the present disclosure.

Specifically, the procedure of establishing a file in the second virtual file system M28 is performed as follows: it is judged, based on the logic directory relation of the file in the original data package, whether a file corresponding to the file creation request in the second virtual file system M28 has a parent node, wherein if such a parent node does not exist, it is judged, hierarchically upwards, whether the parent node has a parent node, that is, from the current node back to the last node which has a parent node; and when it is determined that a node at a certain level has a parent node, a file descriptor of the node corresponding to the file is created hierarchically downwards. The procedures of establishing a file in the second virtual file system M28 can be described with reference to FIG. 2C. FIG. 2C illustrates a form of display of files in the original data package, wherein a root node root in the original data package comprises two files A1 and A2, the file A1 comprises three files B1, B2, and B3, and the file A2 comprises two files B4 and B5; B1 comprises C1 and C2, B2 comprises C3, B3 comprises C4 and C5, B4 comprises C6, C7, and C8, and B5 comprises C9. When the second virtual file system M28 receives a file creation request for creating C4, it is firstly judged whether C4 in the second virtual file system M28 has a parent node; when it is determined that C4 does not have a parent node B3, it is then judged whether B3 has a parent node; when it is determined that B3 does not have a parent node A1, a file descriptor of the file A1 is then created based on a logic directory relation corresponding to the root and A1, and a parent-child relation with A1 is recorded in the root; then a file descriptor of the file B3 is created based on a logic directory relation corresponding to A1 and B3, and a parent-child relation with B3 is recorded in A1; and then a file descriptor of the file C4 is created based on a logic directory relation corresponding to B3 and C4, and a parent-child relation with C4 is recorded in B3; thus the creation of the files corresponding to the file creation request in the second virtual file system M28 is completed; after the files A1, B3, and C4 are created, the A1, B3, and C4 are displayed under the file root in the second virtual file system in the same form as the files A1, B3, and C4 displayed in FIG. 2C. Then, a ninth channel S9 between the second virtual file system M28 and the second file simulator M21 is created, and specifically, a ninth channel S9 between the second file simulator M21 and each file currently created in the second virtual file system M28 is respectively created; one or more files may be created based on each file creation request, therefore one or more ninth channels may be created after the file(s) is created; for example, as described above, the file creation request is a request for creating C4, then three files are created this time, and three ninth channels S9 are correspondingly created.

Step 203: the data package generation manager acquiring the file creation request via the ninth channel, and creating a corresponding data set in the original image package in accordance with a logic directory relation of a file in the original data package that is corresponding to the file creation request; and establishing a tenth channel between the data package generation manager and the data set in the original image package.

Figure 2D:
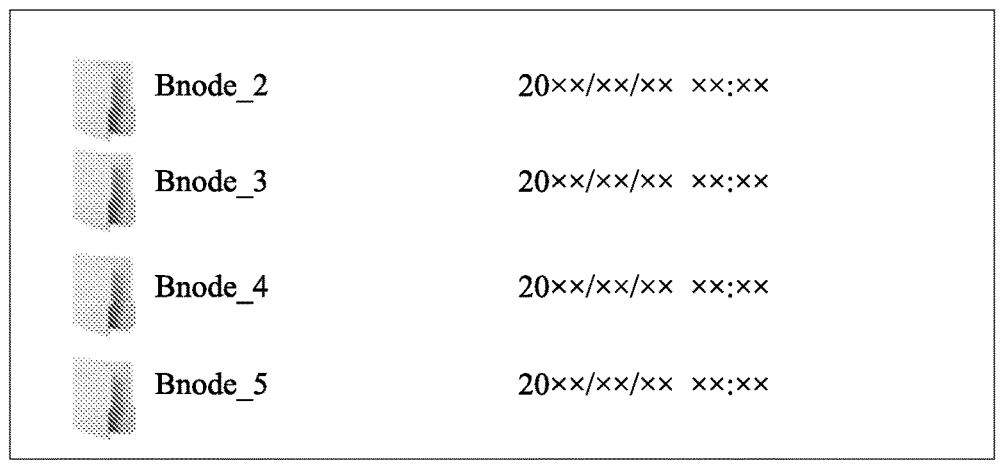
FIG. 2D is a schematic diagram showing a data set display form in an original image package according to the present disclosure.

After recognizing the file creation request, the second virtual file system IO simulator M29 forwards the file creation request to the second file simulator M21 via the ninth channel S9, and the second file simulator M21 sends the file creation request to the second file manager M2C after receiving the file creation request; since there is a mapping relation between the logic directory relation of the original data package and the storage directory structure in the original image package, the second file manager M2C may control the second incremental data manager M22 to create a corresponding data set in the original image package M27. The procedure of creating a data set in the original image package M27 is similar to the procedure of creating a file in the second virtual file system M28 described above, but after the data sets are created, each data set is stored at a same directory level of the original image package M27. The procedure of creating a data set in the original image package is described by taking FIG. 2C as an example. When the file creation request is a request for creating C4, it is determined that C4 in the original image package M27 does not have a parent node B3, B3 does not have a parent node A1, and A1 has a parent node root. Therefore, in the original image package M27, a data set Bnode_2 is opened, which corresponds to the root node root of the original data package; then, a directory structure relation between A1 and root, such as "A1", is stored in the Bnode_2 in the form of a character string, and then a data set Bnode_3 corresponding to A1 is created; then a directory structure relation between A1 and B3, such as "B3", is stored in the Bnode_3, and then a data set Bnode_4 corresponding to B3 is created; then a directory structure relation between C4 and B3, such as "C4", is stored in the Bnode_4, and then a data set Bnode_5 corresponding to C4 is created; the Bnode_5 is an empty data set; thus the creation of the data sets of the original image package is completed; wherein Bnode_2, Bnode_3, Bnode_4, and Bnode_5 are stored in the original image package in the form as shown in FIG. 2D, and all the data sets are stored at the same level, wherein "20xx/xx/xx xx:xx" is the time at which the respective data set is created. Then, a tenth channel S10 between the second file manager M2C and the original image package M27 is established, and specifically, a tenth channel S10 is respectively created between the second file manager M2C and each data set currently created in the original image package; one or more data sets may be created based on each file creation request, therefore one or more tenth channels may be created after the data set(s) is created; for example, as described above, the file creation request is a request for creating C4, then three data sets are created this time, and three tenth channels S10 are correspondingly created; wherein each created ninth channels S9 is in one-to-one correspondence with the respective tenth channels S10. In addition, the data sets created in the original image package include directory-type data sets and data-type data sets, wherein the directory-type data set, such as the above-mentioned Bnode_2, Bnode_3, and Bnode_4, stores a logic directory relation of this data set and a data set at the next level, and the directory structure is stored in an image file of the data set. The data-type data sets, such as Bnode_5, are configured to store the data in the original data package that is used for supporting the launching and running of the target application; therefore, an empty image file can be created for storing data when creating a data-type data set.

The procedure of establishing each tenth channel S10 is specifically performed as follows: (1) the second image cache manager M23 creates and opens an image file in the original image package M27, and initializes relevant content description information in a configuration file, wherein the second image cache manager M23 is configured to manage the corresponding data set(s) in the original image package M27; (2) the second incremental data manager M22 creates a file stream instance, and establishes a data channel between the second incremental data manager and the second image cache manager M23 to open the image file in the original image package M27 via the second image cache manager M23; (3) an attribute (property) description block file and a checksum database file are created in the original image package M27, and the corresponding file stream instance(s) is opened; wherein the attribute description block file and the checksum database file may be one combined file, or may be two separate files; (4) the second file manager M2C opens the file stream instance created by the second incremental data manager M22, and establishes a data channel between the second file manager and the second incremental data manager M22, wherein the second incremental data manager M22 forwards the request from the second file simulator M21 directly to the second image cache manager M23.

Step 204: the data package generation manager receiving a write request via the ninth channel, and writing third data corresponding to the data write request into the data set in the original image package via the tenth channel.

The copy process sends a corresponding write request after sending the file creation request to the second virtual file system M28, the second virtual file system TO simulator M29 recognizes the write request and then sends the write request to the second file simulator M21 via the ninth channel S9, the second file simulator M21 then sends the write request to the second file manager M2C, and the second file manager M2C reads, based on the write request, a directory structure from the respective tenth channels S10 corresponding to each of the directory-type data sets such as Bnode_2, Bnode_3, and Bnode_4 to determine a data-type data set such as Bnode_5 corresponding to the write request; and then the second file manager writes third data corresponding to the write request into the data-type data set via the tenth channel S10 corresponding to the determined data-type data set. In addition, the attribute description block information, such as data set type, data type, the creation time, etc., of the directory-type data sets and the data-type data sets in the original image package M27 may be written into corresponding attribute description block files in the corresponding data sets, respectively.

According to the steps 201 to 204 described above, for each file creation request of the copy process, a file is created in the second virtual file system, and a corresponding data set is created in the original image package; and then for a subsequent write request corresponding to the each file creation request, third data in the original data package M26 of the target application is copied into the original image package M27 until all the original data of the target application is copied into the original image package M27. After the copy process is finished, the files are displayed in the second virtual file system in the same form as the files displayed in the original data package, as shown in FIG. 2C.

In addition, after all the original data of the target application is copied to the original image package, the second virtual file system establishing module 102 invokes an API of the operating system to deactivate the second virtual file system M28, and uninstalls the mount point and disconnects the ninth channel(s) S9 between the second virtual file system M28 and the data package generation manager M2; the data package generation manager establishing module 101 disconnects the tenth channel(s) S10 between the data package generation manager M2 and the original image package M27; and a launch running package, i.e., a launch runner, corresponding to the target application is generated, wherein the launch running package contains a most basic file for launching the target application. When the mobile terminal is running a corresponding application by using the launch running package, the launch running package completes the installation and configuration of basic components and the interaction between the target application and the terminal during the installation of the target application. Meanwhile, the control module M25 launches a configuration process, so that the data package generation manager establishing module 101 invokes the second application manager M2A to scan an image file in each data set of the original image package M27 block by block and generate a corresponding checksum for each data block of the image file in each data set of the original image package M27, wherein the data block may have a size of continuous 8 KB, 16 KB, or 64 KB, and the image file in each data set comprises at least one data block; then the checksum corresponding to each data block of the image file in each data set is saved into the checksum database file of the corresponding data set; then, the checksum database file of each data set is scanned, and a value of Message-Digest Algorithm 5 (MD5) of the database is generated; and the MD5 value, and feature information, such as a download priority, of each data block during the generation of the original image package are updated into the configuration file of the original image package. Thus, it can be seen that the original image package comprises a configuration file and data sets, and the data sets include directory-type data sets and data-type data sets; wherein each of the directory-type data sets and the data-type data sets respectively comprises an image file, a checksum database file, and an attribute description block file.

A system and a method for generating an original image package of an application provided above can be used to generate original image packages of various large applications to reduce development costs of applications such as 3D games, PS, etc. A 3D game is taken as an example to describe a method for generating an original image package of the 3D game by using the above-mentioned system for generating an original image package of an application. Specifically, the 3D game is already installed on a mobile terminal, and an original data package for supporting the running of the 3D game is already stored in the mobile terminal, and an original image package of the 3D game can be created on the mobile terminal. When data of the original data package of the 3D game is to be copied to the original image package of the 3D game, a data set corresponding to a file in the original data package is established in the original image package, and the data is copied into the corresponding data set; after the data copy is completed, the data in an image file in the original image package contains data for supporting the launching and normal running of the 3D game; after the data copy is completed, a corresponding APP Launcher for the 3D game is generated; and the user can launch the 3D game by means of the APP Launcher.

In an embodiment of the present disclosure, during generating of an original image package, after a second virtual file system is established locally, and a data package generation manager is established and an empty original image package is created, when receiving a file creation request, the data package generation manager creates, in accordance with a logic directory relation corresponding to a file in the original data package corresponding to the file creation request, a corresponding data set in the original image package; then the data package generation manager receives a corresponding write request, and writes data corresponding to the write request into the data set in the original image package; thus, all the data of each file in the original data package can be copied into the corresponding data set(s) of the original image package in accordance with the above steps; thus, in the generation of the original image package, the resolution of a running environment on which the application is dependent and the modularized splitting tasks can be omitted, which greatly reduces labor cost and time cost.

After the launch running package and the original image package of the target application are created, if the launch running package of the target application is not stored in the mobile terminal, the launch running package of the target application may be downloaded from the server; if the launch running package of the target application is stored in the mobile terminal, the launch running package can be acquired directly locally, and then the target application can be launched by means of the launch running package; during the launching of the target application, data required by the target application may be acquired from the original image package. Since a lot of data is required in launching the target application, if the original image package of the target application is stored in the server, the user will have to wait for a relatively long time when launching the target application for the first time. In order to reduce the waiting time when the user launches the target application for the first time, a launch image package corresponding to the target application can be made in advance, wherein the launch image package includes data for launching of the target application; the mobile terminal acquires the launch image package while acquiring the launch running package, hence when the target application is to be launched, the data corresponding to launching can be directly acquired locally, which greatly reduces the time required for launching the target application.

Figure 3:
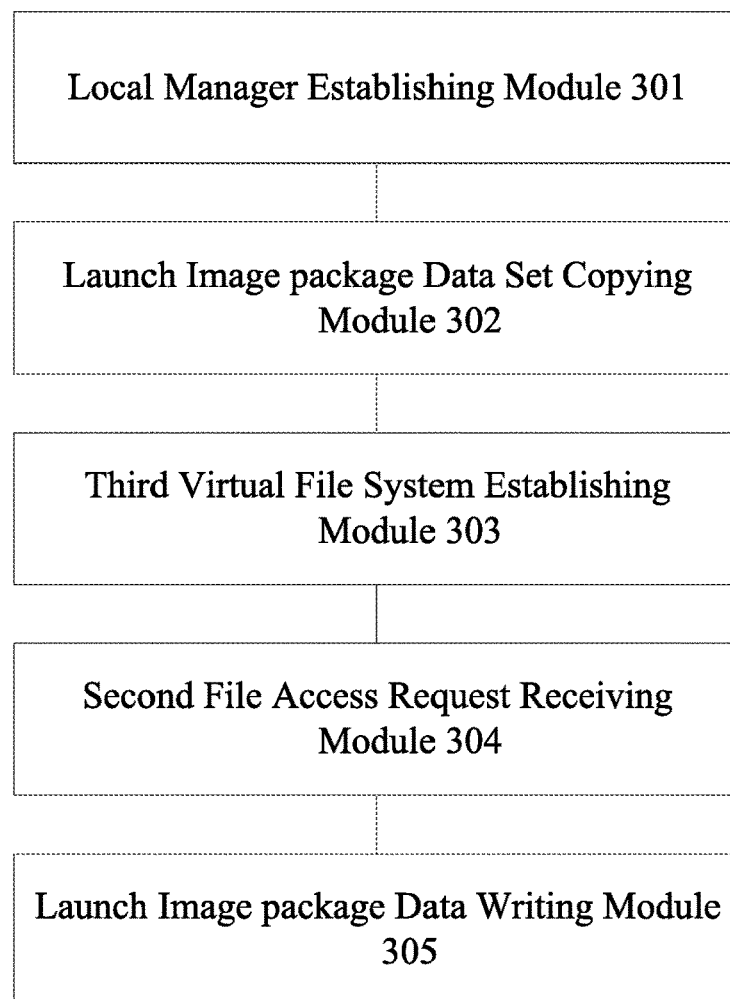
FIG. 3 is a structural block diagram of an embodiment of a system for generating a launch image package of an application according to the present disclosure.

Referring to FIG. 3 which illustrates a structural block diagram of an embodiment of a system for generating a launch image package of an application according to the present disclosure, the system may specifically comprise: a local manager establishing module 301, a launch image package data set copying module 302, a third virtual file system establishing module 303, a second file access request receiving module 304, and a launch image package data writing module 305;

wherein the local manager establishing module 301 is configured to establish a local manager and establish an eleventh channel(s) between the local manager and a data set in an original image package when a target application is launched.

The launch image package data set copying module 302 is configured to copy, in accordance with a storage directory structure of the data set in the original image package, the data set in the original image package into a launch image package, and to determine a data set(s) in the launch image package as a basic data set(s), and to establish a twelfth channel(s) between the local manager and the basic data sets in the launch image package, wherein the image files of the basic data sets is empty.

The third virtual file system establishing module 303 is configured to locally create a third virtual file system and establish a thirteenth channel(s) between the local manager and the third virtual file system.

The second file access request receiving module 304 is configured to invoke the local manager to receive a file access request via the thirteenth channel, wherein the file access request is received by the third virtual file system from the target application.

The launch image package data writing module 305 is configured to invoke, when the file access request is a read request, the local manager to acquire fourth data corresponding to the read request from the original image package via the eleventh channel; and to write the fourth data into the image files of the basic data sets via the twelfth channels; and to stop writing the fourth data into the image files of the basic data sets when the target application stops running; wherein the twelfth channel respectively corresponds to each data set in the launch image package; and the eleventh channel respectively corresponds to each data set in the original image package.

In an embodiment of the present disclosure, the local manager establishing module 301, the launch image package data set copying module 302, the third virtual file system establishing module 303, the second file access request receiving module 304, and the launch image package data writing module 305 are all deployed on the mobile terminal.

In an embodiment of the present disclosure, the target application may be launched by means of a launch running package, or the target application may also be launched by means of a control panel, wherein both the control panel and the launch running package are corresponding to different control modules; when the target application is launched, the control module acquires an identifier corresponding to the target application, such as an APP ID, from the launch running package; and a data generating process is launched, so that the local manager establishing module 301 establishes a local manager, and then the control module sends the identifier of the target application to the local manager; wherein if the original image package of the target application is stored in a local cache, the local manager searches for an original image package corresponding to the identifier of the target application, and then establishes an eleventh channel between the local manager and the original image package; if the original image package of the target application is stored in the server, the local manager establishes, based on the identifier of the target application, an eleventh channel between the local manager and an original image package in the server corresponding to the identifier of the target application; here, same as the embodiment described above, an eleventh channel between each data set in the original image package and the local manager is created respectively for each data set in the original image package; and configuration information corresponding to the target application is acquired from the original image package. The launch image package data set copying module 302 firstly creates an empty launch image package based on the acquired configuration information; wherein the capacity of the launch image package is equal to the capacity of the original image package; and then the data set(s) in the original image package is copied into the launch image package. Specifically, a directory-type data set and its corresponding contents in the original image package are copied into the launch image package; a data-type data set in the original image package, each file contained in the data-type data set, and the contents of each file are copied into the launch image package, and the contents of an image file in the data-type data set are cleared and the contents of other files are retained; and a configuration file in the original image package is also copied into the launch image package; wherein the data set(s) in the launch image package is determined as a basic data set(s); thus it can be seen that the launch image package comprises a configuration file and a basic data set, and the basic data set includes directory-type basic data sets and data-type basic data sets; wherein each of the directory-type basic data set and the data-type basic data set respectively comprises an image file, a checksum database file, and an attribute description block file; wherein the image files of the data-type basic data sets are empty. During the copying of the data sets, the respective data sets are copied one by one into the launch image package in accordance with the storage directory structure of the data sets in the original image package to obtain a basic data set(s). During the copying of the data sets, the local manager may also create a second incremental data set for each data-type basic data set, the second incremental data set being used for storing data generated by the operating system and/or the target application during running of the target application; after each basic data set is created, a twelfth channel between the local manager and the basic data set in the launch image package is established, wherein when the twelfth channel is to be established, a twelfth channel is respectively established between the local manager and the image file in each basic data set in the launch image package; and a twelfth channel is respectively established between the local manager and each second incremental data set in the data-type basic data set.

Then, the third virtual file system establishing module 303 locally creates a third virtual file system. When the third virtual file system is created, in accordance with the storage directory structures of the basic data sets in the launch image package, a corresponding file is established in the created third virtual file system according to a mapping relation, that is to say, in accordance with the directory-type basic data sets in the launch image package, a file descriptor of a corresponding file is established in the third virtual file system. When the file descriptor of the file is initialized, contents thereof are read from a corresponding attribute description block file in the launch image package, and a parent-child relation between the file descriptor of the file and a file descriptor of its parent file is established; and for example, a process in which Bnode_3, Bnode_4, and Bnode_5 in FIG. 2D are mapped to A1, B3, and C4 in FIG. 2C respectively. Then, a thirteenth channel between the local manager and the file descriptor of each file in the third virtual file system is established; after the operating system creates a corresponding mount point for the third virtual file system, the second file access request receiving module 304 may invoke the local manager to receive a file access request via the thirteenth channel(s); when the launch image package data writing module 305 determines that the file access request is a read request, the local manager is invoked to acquire fourth data corresponding to the read request from the original image package via the eleventh channel(s); and the fourth data is written via the twelfth channel(s) into the launch image package, that is, into the image files of the basic data sets in the launch image package; and meanwhile, the local manager returns the acquired fourth data to the target application via the thirteenth channel(s).

When the target application stops running, the writing of the fourth data into the image files of the basic data sets is stopped. In an embodiment of the present disclosure, the time when the target application stops running may be the time when the target application is just launched, or may be within a short time after the target application is launched, to ensure that the data in the launch image package only occupies a small portion of the original image package. Preferably, the data amount of the launch image package is less than 5% of the data amount of the original image package, for example, when 30 minutes have elapsed after the target application is launched; thus, it is ensured that the mobile terminal acquires the launch image package in a short time. For example, if a game A can be played to level 6 when the game A is tried (played) for 20 minutes on the mobile terminal, the launch image package of the game A contains data on the game A from the launching to level 6. For example, the data stored in the launch image package may only account for 3% of the original image package; if the original image package of the game A is 4.3 GB in size, the launch image package of the game A has a capacity of 4.3 GB, and the data stored in the launch image package accounts for 3% of 4.3 GB; that is to say, the storage space actually occupied by the launch image package is only 4.3 GB*3%=0.129 GB. Preferably, the launch image package may be further processed by a compression algorithm, such that the launch image package can be smaller.

Figure 4B:
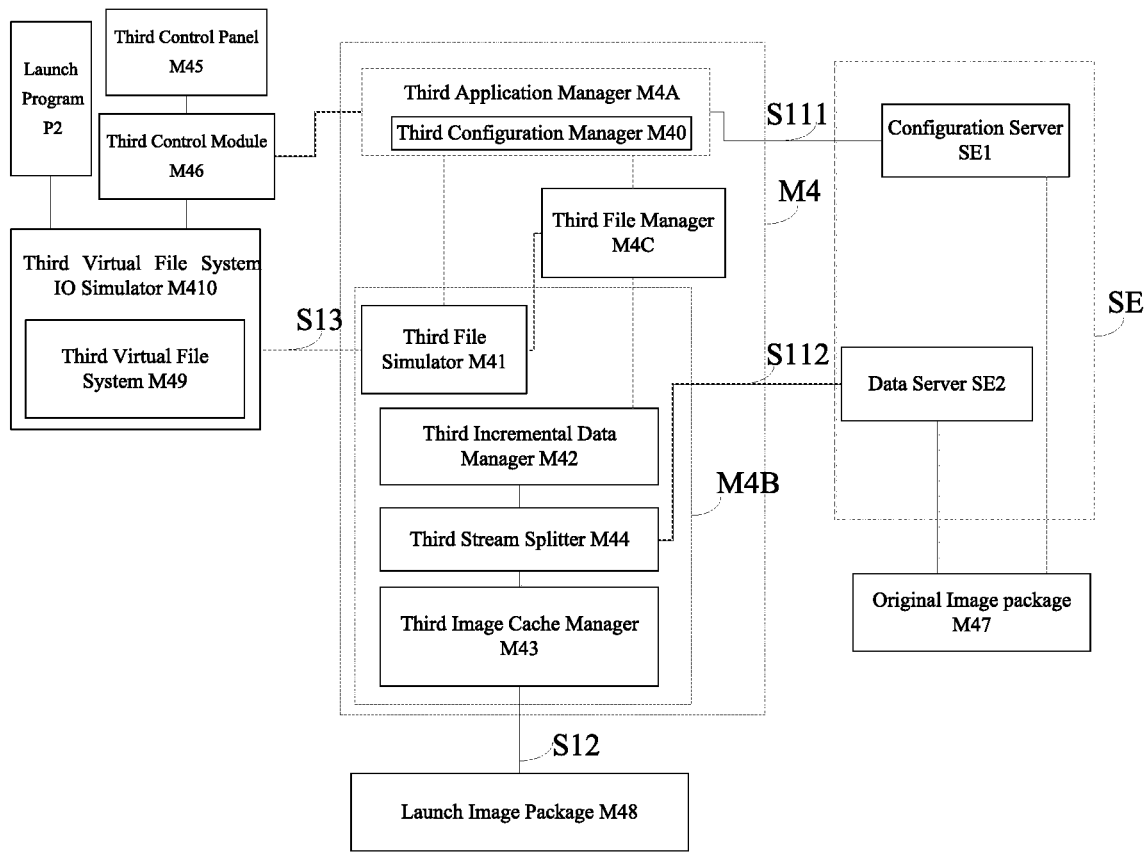
FIG. 4B is a structural block diagram of another embodiment of a system for generating a launch image package of an application according to the present disclosure.

In another embodiment of the present disclosure, a method corresponding to the system for generating a launch image package of an application is described with particular reference to FIGS. 4A and 4B, wherein FIG. 4A illustrates a flow chart showing the steps of an embodiment of a method for generating a launch image package of an application according to the present disclosure; and FIG. 4B illustrates a structural block diagram of another embodiment of a system for generating a launch image package of an application according to the present disclosure.

The local manager M4 in embodiments of the present disclosure may comprise: a third application manager M4A, a third storage stack M4B, and a third file manager M4C, wherein the third application manager may comprise a third configuration manager M40; the third storage stack M4B may comprise: a third file simulator M41, a third incremental data manager M42, a third image cache manager M43, and a third stream splitter M44. The generation of a launch image package of an application will be described in detail below by using the managers and the storage stack included in the local manager described above.

Step 401: establishing, when a target application is launched, a local manager and establishing an eleventh channel between the local manager and each data set in the original image package.

Step 402: copying, in accordance with a storage directory structure of the data set in the original image package, the data set in the original image package into a launch image package, determining the data set in the launch image package as a basic data set, and establishing a twelfth channel between the local manager and the basic data set, wherein an image file of the basic data set is empty.

In an embodiment of the present disclosure, when a launch program P2 corresponding to a target application is launched by means of a launch running package of the target application or by means of a third control panel M45, the local manager establishing module 301 establishes a local manager M4, and specifically, the third control module M46 activates a third application manager M4A, and establishes a third file manager M4C, a third file simulator M41, a third incremental data manager M42, a third image cache manager M43, and a third stream splitter M44; wherein a third configuration manager M40 in the third application manager M4A is also activated; the third file manager M4C is configured to manage the opening and closing of the basic data sets in the launch image package and the reading and writing of data from/into the basic data sets; if the original image package M47 of the target application is stored locally, an eleventh channel between the local manager M4 and the local original image package M47 is established; if the original image package M47 of the target application is stored in the server, it is preferable that establishment of an eleventh channel between the local manager M4 and the original image package M47 on the server SE may include: establishing a channel(s) S111 between the third application manager M4A and a configuration server SE1 to acquire configuration information on the original image package; and establishing a channel(s) S112 between the third stream splitter M44 and a data server SE2 to acquire data of each data set in the original image package, wherein the channel S111 is corresponding to a configuration file in the original image package, and the channels S112 are corresponding to the data sets in the original image package, respectively. After the third file manager M4C acquires the configuration information in the original image package, an empty launch image package having the same capacity as that of the original image package is established in accordance with the configuration information; and then the data sets in the original image package are copied into the launch image package via the channels S112. During copying, except that it is unnecessary to copy the content of an image file in the data-type data set in the original image package to the image file of the data-type basic data set in the launch image package, the files and corresponding contents of the data set in the original image package are all copied into the basic data set of the launch image package. During the copying of the data sets, a second incremental data set may also be established in the data-type basic data set, wherein a file in the second incremental data set may be stored in the form of an image file. In addition, the configuration file in the original image package may also be copied into the launch image package.

Then, the launch image package data set copying module 302 establishes a twelfth channel S12 between the local manager M4 and the launch image package M48. Specifically, (1) the third image cache manager M43 opens the image file of the basic data set in the launch image package M48 and initializes content description information; (2) the third stream splitter M44 will initialize a file stream instance, a channel between the third stream splitter M44 and an image file of a corresponding data set in the original image package M47 is established to acquire the data of the image file in the original image package M47, and a data channel is established between the third stream splitter and the image file instance of the basic data set opened by the third image cache manager M43; (3) the third incremental data manager M42 will create a file stream instance, a channel between the third incremental data manager and the file stream instance in the third stream splitter M44 is established, and the image file of the second incremental data set is opened, initialized data distribution is checked, and description information is established in the memory; (4) a file stream instance corresponding to an attribute description block file and a checksum database file is opened in the launch image package M48; wherein the attribute description block file and the checksum database file may be one combined file, or may be two separate files; (5) the file stream instance created by the third incremental data manager M42 is opened by the third file manager M4C. Here, a twelfth channel S12 is respectively established between the image file of each basic data set in the launch image package and the third file manager M4C; and a twelfth channel S12 is respectively established between each second incremental data set in the data-type basic data set and the third incremental data manager M42.

Step 403: creating locally a third virtual file system, and establishing a thirteenth channel between the local manager and the third virtual file system.

After the eleventh channel (including S111 and S112) and the twelfth channel S12 are established, the third control module M46 launches a file system creation process, and a third virtual file system M49 is created in the mobile terminal by the third virtual file system establishing module 303, wherein files in the third virtual file system M49 are created in accordance with the storage directory structure of the data sets in the launch image package; the files in the third virtual file system are in one-to-one correspondence to the data sets in the launch image package; then a thirteenth channel(s) S13 between the third virtual file system M49 and the third file simulator M41 is established, each file in the third virtual file system M49 respectively corresponds to a thirteenth channel, and thus the twelfth channels are in one-to-one correspondence to the thirteenth channels; and then the operating system of the mobile terminal creates a mount point for the third virtual file system M49, and processes in the operating system can access the third virtual file system via the mount point. In addition, in the operating system, there is a third virtual file system IO simulator M410 corresponding to the third virtual file system M49 for recognizing an operation of accessing a file of the third virtual file system M49.

Step 404: the local manager receiving a file access request via the thirteenth channel(s), wherein the file access request is received by the third virtual file system from the target application.

During the launching and running of the target application, the third virtual file system M49 can be accessed to acquire the required data by the third virtual file system M49; after the third virtual file system IO simulator M410 acquires a file access request from the target application, the file access request is forwarded to the third file simulator M41 via the thirteenth channel S13; and the second file access request receiving module 304 invokes the third file simulator M41 to acquire the file access request via the thirteenth channels S13.

Step 405: when the file access request is a read request, invoking the local manager to acquire fourth data corresponding to the read request from the original image package via the eleventh channel; and writing the fourth data into an image file of the basic data set via the twelfth channel; and stopping w writing the fourth data into the image file of the basic data set when the target application stops running.

The third file simulator M41 forwards the file access request to the third file manager M4C, and the third file manager M4C then sends the file access request to the third incremental data manager M42; when the third incremental data manager M42 determines that the file access request is a read request, the launch image package data writing module 305 invokes the third incremental data manager M42 to forward the read request to the third stream splitter M44 based on the created file stream instance, and the third stream splitter M44 acquires fourth data corresponding to the read request from the image file of the data-type data set of the original image package M47; after the fourth data is acquired, a corresponding checksum A is generated for a data block of the fourth data; a data-type basic data set in the launch image package corresponding to the fourth data is determined, and a checksum B of the data block corresponding to the fourth data is searched in a checksum database file of the data-type basic data set; the checksum A and the checksum B are compared; when the two checksums match, the fourth data is saved in the image file of the corresponding data-type basic data set in the launch image package, and a second bit identifier of the data block corresponding to the fourth data is set as a third state; when the two checksums do not match, the fourth data is re-acquired from the original image package M47, and the above-mentioned checksum matching operation is repeated; if the checksum of the fourth data is not successfully matched for multiple times, the fourth data may be firstly saved in the corresponding data-type basic data set in the launch image package, and the second bit identifier of the data block corresponding to the fourth data is set as a fourth state; and the fourth data can be acquired from the original image package again when the target application is launched next time. Here, the second bit identifier is an identifier of a data block in an image file of a data-type basic data set; the third state is a valid state of the data block in the image file of the data-type basic data set; and the fourth state is an invalid state of the data block in the image file of the data-type basic data set.

In addition, the third stream splitter M44 returns the fourth data having a second bit identifier in the third state and corresponding to the data block to the third incremental data manager M42 via the file stream instance, the third incremental data manager M42 returns the fourth data to the third file manager M4C, the third file manager M4C then forwards the fourth data to the third file simulator M41, and the third file simulator M41 returns the fourth data to the target application via the thirteen channels S13.

When the target application stops running after running for a period of time, writing of the fourth data into the launch image package M48 is stopped; at this time, the generation of the launch image package M48 is completed; and the made and finished launch image package may be uploaded to a data server in order to allow more mobile terminals to acquire the launch image package M48 of the target application.

In addition, during the running of the target application, the operating system or the target application itself will generate a write operation; therefore, during the generation of the launch image package, the local manager may create, based on the received file creation request, a first incremental data set in the launch image package; and then when the received file access request is a write request, data corresponding to the write request may be written into the first incremental data set or into the second incremental data set.

A system and a method for generating a launch image package of an application provided above can be used for generating launch image packages for applications such as 3D games, PS, etc. Since the launch image package is much smaller than the original image package, the waiting time when the user uses a 3D game or PS for the first time can be reduced. A 3D game is taken as an example to describe a method for generating a launch image package of the 3D game using the above-mentioned system for generating a launch image package of an application. Specifically, the 3D game is tried by activating an APP Launcher on a mobile terminal in which the APP Launcher of the 3D game is already acquired; after the 3D game is launched, the system will create a launch image package of the 3D game, wherein basic data sets in the launch image package are the same as the data sets in the original image package; then the eleventh channel, the twelfth channel, and the thirteenth channel described above are established; then the system will acquire data required by the 3D game from the original image package via the eleventh channel; the data is returned to the 3D game via the thirteenth channel to ensure the normal running of the 3D game; and then the data acquired from the original image package is written into the launch image package via the twelfth channel; when the 3D game is tried for 20 to 30 minutes, the 3D game has been launched, and runs to the first few levels; then the 3D game is shut down, and at this time, the launch image package contains launch data about the 3D game and data about the first few levels. In this way, when the APP is launched next time, the launch data and the resource data about the first few levels can be directly acquired from the local launch image package. The time and content of the trial may be determined according to the size of the 3D game or the game mode, and in addition, the time of the trial may also be different for different types of games, such as real-time strategic games, and cosplay games.

In an embodiment of the present disclosure, when a launch image package is established, the data sets in the original image package is copied into the launch image package in accordance with the storage directory structure of the data sets in the original image package, and the data sets in the launch image package is determined as a basic data sets, wherein the procedure of copying the data sets includes copying the contents in the data set; the data sets in the original image package are in one-to-one correspondence to the basic data sets in the launch image package, so that the resolution of a running environment on which the application is dependent and the modularized splitting tasks can be omitted in the creation of the launch image package to greatly reduce labor cost and time cost; in addition, after the target application runs for a period of time, the writing of data into the launch image package is stopped, so that the launch image package includes a small portion of data of the original data package of the target application, thus the time required by the mobile terminal to acquire the launch image package is greatly reduced.

Figure 5A:
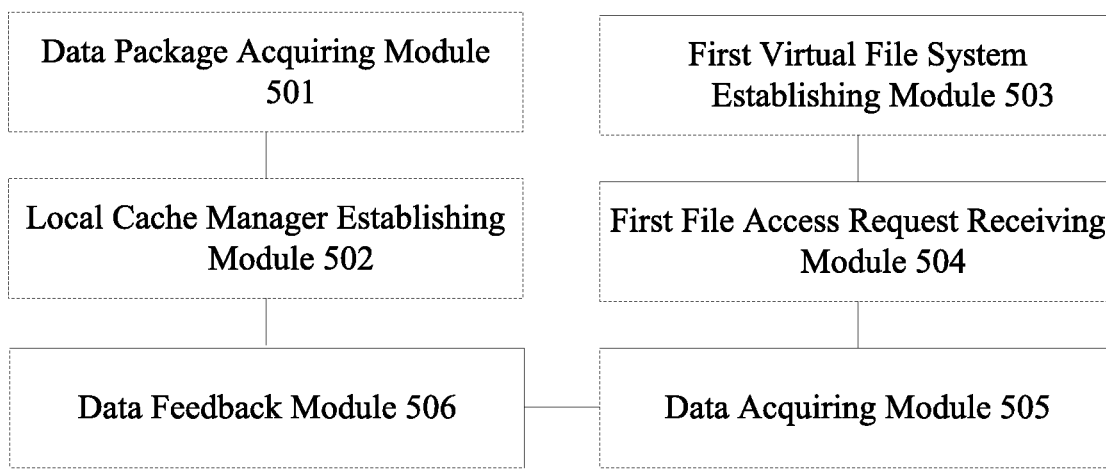
FIG. 5A is a structural block diagram of an embodiment of a system for running an application according to the present disclosure.

Referring to FIG. 5A which illustrates a structural block diagram of an embodiment of a system for running an application according to the present disclosure, the system specifically comprises: a data package acquiring module 501, a local cache manager establishing module 502, a first virtual file system establishing module 503, a first file access request receiving module 504, a data acquiring module 505, and a data feedback module 506, wherein the data package acquiring module 501 is configured to acquire a launch running package and a launch image package of a target application in advance when the target application is not installed, wherein the launch running package is configured to launch the target application, and the launch image package includes launch data about the target application.

The local cache manager establishing module 502 is configured to establish a local cache manager, establish a first channel(s) between the local cache manager and the launch image package, and establish a second channel(s) between the local cache manager and a server when the target application is launched by the launch running package.

The first virtual file system establishing module 503 locally creates a first virtual file system, and establishes a third channel(s) between the local cache manager and the first virtual file system.

The first file access request receiving module 504 is configured to invoke the local cache manager to receive a file access request via the third channel, wherein the file access request is received by the first virtual file system from the target application.

The data acquiring module 505 is configured to: invoke, when the file access request is a read request, the local cache manager to acquire first data for the read request from the launch image package via the first channel; and/or invoke the local cache manager to acquire first data for the read request from an original image package on the server via the second channel; wherein the original image package includes launch data and running data about the target application.

The data feedback module 506 is configured to feed back the first data to the target application via the third channel to cause the target application to run; wherein storage directory structures of data sets in the launch image package and the original image package correspond to logic directory relations of files in an original data package of the target application, respectively; the first channel respectively corresponds to each data set in the launch image package; and the second channel respectively corresponds to each data set in the original image package.

In an embodiment of the present disclosure, the data package acquiring module 501, the local cache manager establishing module 502, the first virtual file system establishing module 503, the first file access request receiving module 504, the data acquiring module 505, and the data feedback module 506 are all deployed on a mobile terminal, and the system for running an application may be deployed on various different mobile terminals, that is to say, the target application may be run on the mobile terminals. If the mobile terminal for running the target application is the same as the mobile terminal for generating the launch image package of the target application described above, the first channel, the second channel, and the third channel in the embodiment of the present disclosure are the same as the twelfth channel, the eleventh channel, and the thirteenth channel described above, respectively, and the first virtual file system and the third virtual file system are the same virtual file system; if the mobile terminal for running the target application is different from the mobile terminal for generating the launch image package of the target application described above, the first channel, the second channel, and the third channel in the embodiment of the present disclosure are not the same as the twelfth channel, the eleventh channel, and the thirteenth channel described above, respectively, and the first virtual file system and the third virtual file system are not the same virtual file system.

The data package acquiring module 501 may acquire the launch running package and the launch image package of the target application locally, or acquire the launch running package and the launch image package from the server when the target application is not installed in advance. Since both the launch running package and the launch image package of the target application are relatively small, the user's waiting time is greatly shortened. After the user installs the launch running package of the target application, the target application may be launched by means of the launch running package; the local cache manager establishing module 502 establishes a local cache manager after the target application is launched; and then the local cache manager is invoked to search for a launch image package corresponding to the launch running package; and then a first channel between the local cache manager and the launch image package is established, and a second channel between the local cache manager and the server is established; after the establishment of the first channel and the second channel is completed, the first virtual file system establishing module 503 locally creates a first virtual file system, and establishes a third channel between the local cache manager and the first virtual file system; the first file access request receiving module 504 invokes the local cache manager to receive a file access request via the third channel, wherein the file access request is received by the first virtual file system from the target application; here, the local cache manager establishing module 502, the first virtual file system establishing module 503 and the first file access request receiving module 504 have the same functions as the local manager establishing module 301, the third virtual file system establishing module 303 and the second file access request receiving module 304 described above, respectively, and therefore are not described in detail herein. When the file access request is a read request, the data acquiring module 505 invokes the local cache manager to acquire first data for the read request from the launch image package via the first channel, or invokes the local cache manager to acquire first data for the read request from the original image package on the server via the second channel, or acquires first data from the launch image package and the original image package; and the data feedback module 506 feeds back the first data to the target application via the third channel to cause the target application to run.

In addition, it is possible that either when the target application is launched for the first time, or each time the target application is launched, the local cache manager establishing module 502 establishes a local cache manager, establishes a first channel between the local cache manager and the launch image package, and establishes a second channel between the local cache manager and the server, and the first virtual file system establishing module 503 locally creates a first virtual file system, and establishes a third channel between the local cache manager and the first virtual system.

Figure 5B:
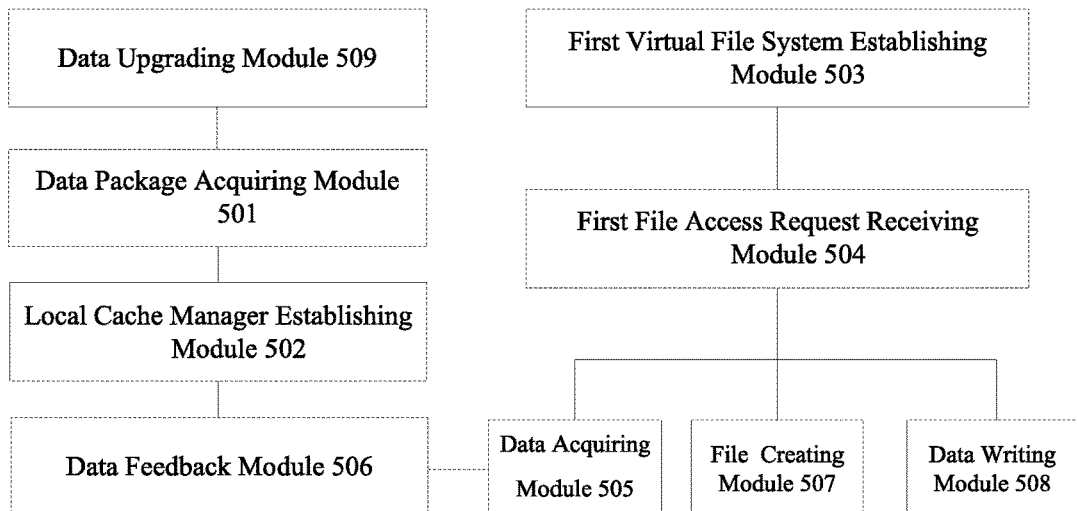
FIG. 5B is a structural block diagram of another embodiment of a system for running an application according to the present disclosure.

Preferably, in another example of the present disclosure, the system for running an application further comprises: a file creating module 507, a data writing module 508, and a data upgrading module 509; referring to FIG. 5B, a structural block diagram of another embodiment of a system for running an application according to the present disclosure is illustrated, wherein the file creating module 507 is configured to: create, when the local cache manager receives a file creation request, a first incremental data set in the launch image package according to the file creation request; and create a fourth channel between the first incremental data set and the local cache manager.

The data writing module 508 is configured to: write, when the file access request is a write request, second data corresponding to the write request into a corresponding second incremental data set via the first channel, and set a first bit identifier of a data block corresponding to the second data in the second incremental data set as a first state; or write second data corresponding to the write request into the first incremental data set via the fourth channel.

The data upgrading module 509 is configured to acquire an upgrade launch image package of the target application when the target application needs to be upgraded, wherein the upgrade launch image package includes partial update data of the target application; after the local cache manager is established, a seventh channel between the local cache manager and the upgrade launch image package is established, and an eighth channel between the local cache manager and the server is established; before acquiring the first data from the launch image package and/or the original image package, the local cache manager acquires the first data for the read request from the upgrade launch image package via the seventh channel; and/or, the local cache manager acquires the first data for the read request from an upgrade original image package on the server via the eighth channel; wherein the upgrade original image package includes all the update data of the target application; wherein storage directory structures of data sets in the upgrade launch image package and the upgrade original image package correspond to logic directory relations of files in an original upgrade data package of the target application, respectively; the seventh channel respectively corresponds to each data set in the upgrade launch image package; and the eighth channel respectively corresponds to each data set in the upgrade original image package.

During running of the target application, the target application needs to read the data in the launch image package to ensure the normal running of the target application, and additionally needs to save data modified or newly added by the system, such as a change in character model, newly added user information, or the like, to the local launch image package based on the operation of the system, therefore the file access request sent from the target application to the first virtual file system during running of the target application includes: a file creation request, a write request, and a read request; when the file creating module 507 determines that the local cache manager receives a file creation request, the file creating module creates a first incremental data set in the launch image package according to the file creation request; and establishes a fourth channel between the first incremental data set and the local cache manager so that data corresponding to the write request is written into the first incremental data set based on the operation of the system. In an embodiment of the present disclosure, the launch image package includes basic data sets, and each basic data set includes a second incremental data set; and when the data writing module 508 determines that the local cache manager receives a write request, second data corresponding to the write request is written to a corresponding second incremental data set via the first channel, and a first bit identifier of a data block corresponding to the second data in the second incremental data set is set as a first state; or second data corresponding to the write request is written into the first incremental data set via the fourth channel. Here, the specific step of writing the second data into the second incremental data set includes: writing, when it is determined that the second data is to be written into the second incremental data set, both successfully updated data and unsuccessfully updated data into the second incremental data set; setting a first bit identifier of the successfully updated data block into a first state such as 1; and setting a first bit identifier of the unsuccessfully updated data block into a second state such as 0. Here, the first bit identifier is an identifier of a data block of the second incremental data set, the first state is a state in which the data block is updated successfully, and the second state is a state in which the data block is not updated successfully.

In the prior art, if a target application needs to be upgraded, a company to which the target application belongs needs to split and modularly process the program data packages of the target application again to generate a new micro client; thus, the efficiency of upgrading the target application is greatly reduced. Therefore, in an embodiment of the present disclosure, after the target application is upgraded, it is only necessary to copy all the data that needs to be upgraded in the target application into an upgrade original image package in accordance with the above-mentioned procedures of generating an original image package; and then an upgrade launch image package of the upgrade data is made in accordance with the above-mentioned procedures of generating a launch image package of the target application; when the user selects to upgrade on a mobile terminal, the mobile terminal only needs to download the upgrade launch image package directly from the server; when the target application is launched, in addition to the establishment of the above-mentioned data channels, a seventh channel between the local cache manager and the upgrade launch image package may be established, and an eighth channel between the local cache manager and the server may be established; and before acquiring the first data from the launch image package and/or the original image package, the local cache manager acquires the first data for the read request from the upgrade launch image package via the seventh channel; and/or, the local cache manager acquires the first data for the read request from the upgrade original image package on the server via the eighth channel; thus, the efficiency of upgrading the target application is increased.

Figure 6A:
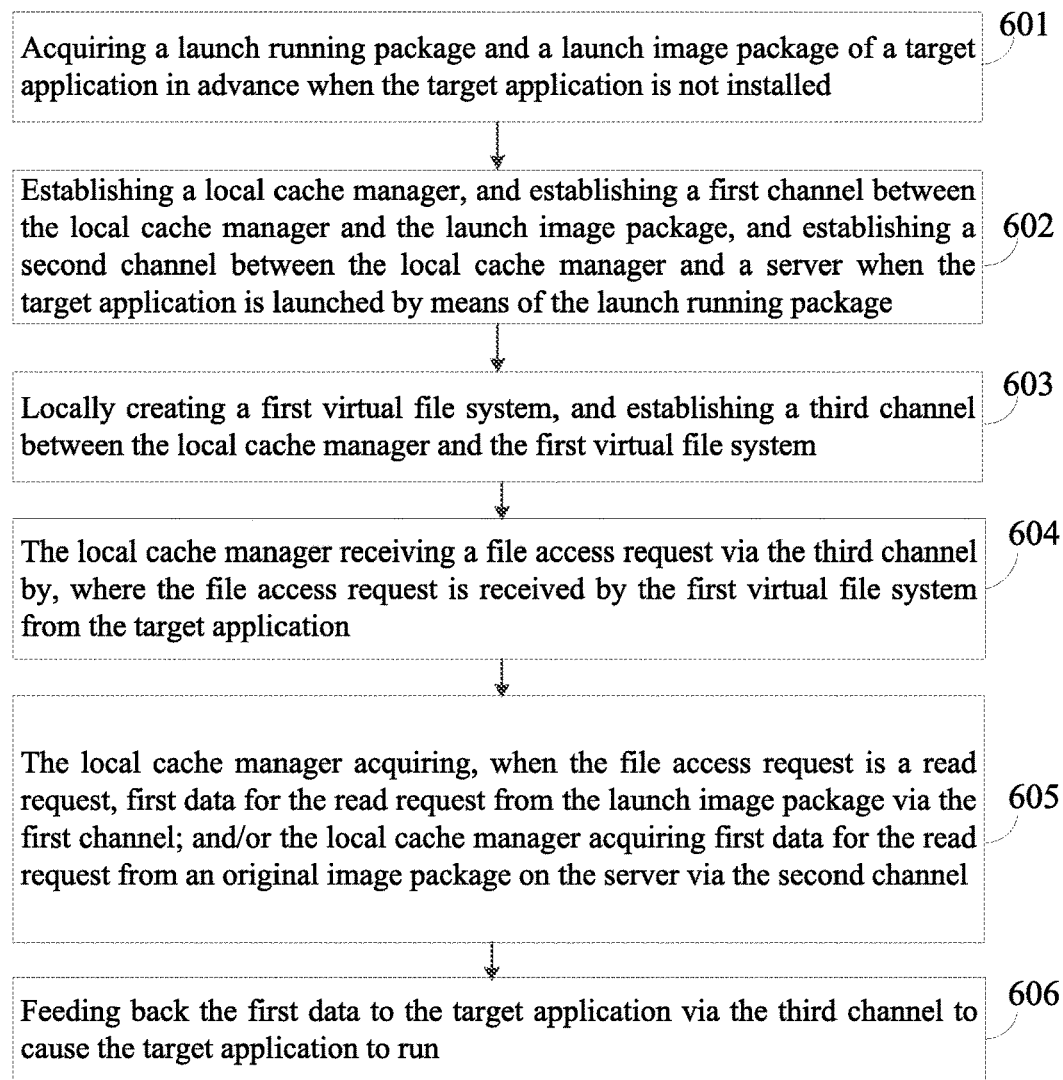
FIG. 6A is a flow chart showing the steps of an embodiment of a method for running an application according to the present disclosure.
Figure 6B:
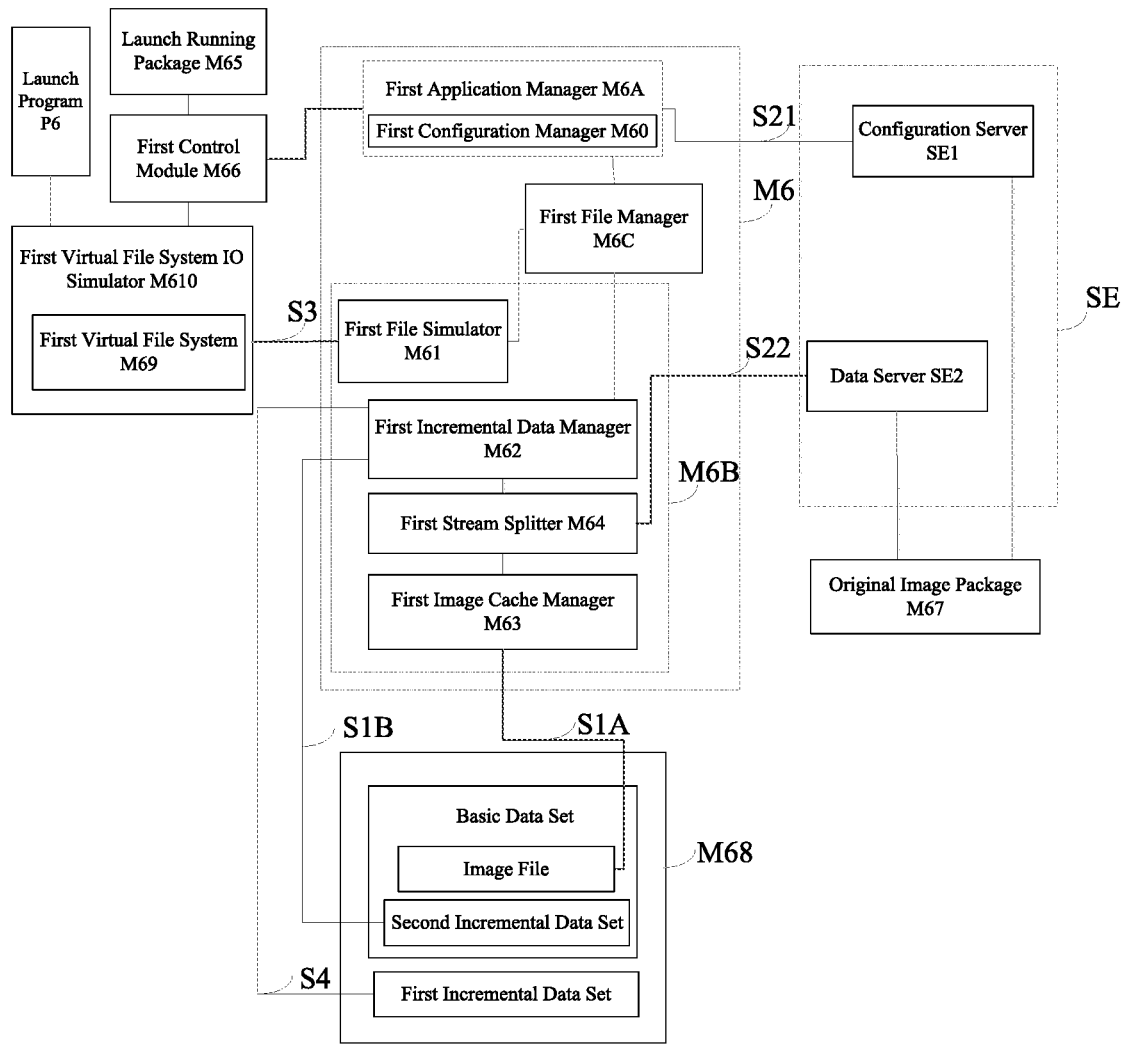
FIG. 6B is a structural block diagram of another embodiment of a system for running an application according to the present disclosure.

In another embodiment of the present disclosure, a method corresponding to a system for running an application is described with particular reference to FIGS. 6A and 6B, wherein FIG. 6A illustrates a flowchart showing the steps of an embodiment of a method for running an application according to the present disclosure; and FIG. 6B illustrates a structural block diagram of another embodiment of a system for running an application according to the present disclosure.

As can be seen from the above embodiments, the original image package comprises a configuration file and a data set(s), wherein the data set comprises an image file, a checksum database file, and an attribute description block file, and the data sets are divided into directory-type data set(s) and data-type data set(s), wherein the image file in the directory-type data set is configured to store logic directory relations (directory entries) of files, and the image file of the data-type data set is configured to store data in the original data package that supports launching and running of the target application. The launch image package comprises a configuration file and a basic data set, wherein the configuration file of the launch image package has the same contents as the configuration file of the original image package; the directory-type basic data set contains the same files and contents as those contained in the directory-type data set in the original image package; the data-type basic data set has the same files and contents as the data-type data set in the original image package except for the image file; in addition, the data-type basic data set further comprises a second incremental data set for storing data generated by the operating system or target application during the running of the target application.

The local cache manager M6 in the embodiment of the present disclosure may comprise: a first application manager M6A, a first storage stack M6B, and a first file manager M6C, wherein the first application manager M6A may comprise a first configuration manager M60; the first storage stack M6B may comprise: a first file simulator M61, a first incremental data manager M62, a first image cache manager M63, and a first stream splitter M64.

Step 601: acquiring a launch running package and a launch image package of a target application when the target application is not installed in advance, wherein the launch running package is configured to launch the target application, and the launch image package includes launch data about the target application.

To run a target application in any mobile terminal in which the target application is not installed, it is necessary to locally acquire a launch running package M65 and a launch image package M68 of the target application in advance; if the launch running package M65 and the launch image package M68 of the target application does not exist locally, the launch running package M65 and the launch image package M68 are acquired from the server, and saved locally. After the launch running package M65 and the launch image package M68 are successfully acquired, when the user clicks on the launch running package M65, the mobile terminal directly opens the launch running package M65, completes the installation of basic components for launching the target application, and runs a corresponding launch program P6 to launch the corresponding target application. The launch data included in the acquired launch image package M68 may be data required by the target application during the procedure from a shutdown state to a fully launched state of the target application, or may be data required by the target application during running for a period of time after the target application is brought into the fully launched state from the shutdown state; and this depends on the time during which the target application is running while the launch image package of the target application is being made in the above embodiment.

Step 602: when the target application is launched by means of the launch running package, establishing a local cache manager, and establishing a first channel(s) between the local cache manager and the launch image package, and establishing a second channel between the local cache manager and a server.

When the target application is launched, the local cache manager establishing module 502 establishes a local cache manager M6, and specifically, the first control module M66 invokes a local cache establishing process, activates a first application manager M6A, and controls the first application manager M6A to establish a first file manager M6C, a first file simulator M61, a first incremental data manager M62, a first image cache manager M63, and a first stream splitter M64; wherein a first configuration manager M60 in the first application manager M6A is also activated. Then, a first channel between the local cache manager M6 and the launch image package M68 is established, and a second channel between the local cache manager M6 and the server is established.

Step 603: creating locally a first virtual file system, and establishing a third channel between the local cache manager and the first virtual file system.

Step 604: the local cache manager receiving a file access request via the third channel, wherein the file access request is received by the first virtual file system from the target application.

The step 603 and the step 604 are the same as the steps 403 and 404 described above, respectively, and therefore are not described in detail herein.

Step 605: when the file access request is a read request, the local cache manager acquiring first data for the read request from the launch image package via the first channel; and/or the local cache manager acquiring first data for the read request from an original image package on the server via the second channel; wherein the original image package includes launch data and running data about the target application.

After the first channel and the second channel are established, the first control module M66 launches a file system creation process, and a first virtual file system M69 is created in the mobile terminal by the first virtual file system establishing module 503; after the operating system recognizes the first virtual file system M69, a file(s) corresponding to the basic data set(s) in the launch image package is created for the first virtual file system M69 in accordance with the manner of creation of the file(s) in the third virtual file system M49 described above; and then a third channel S3 between the first virtual file system M69 and the first file simulator M61 is established; each file in the first virtual file system M69 respectively corresponds to a third channel S3; thus, the first channels and the third channels are in one-to-one correspondence to each other; then the operating system of the mobile terminal creates a mount point for the first virtual file system M69, and processes in the operating system can access the first virtual file system via the mount point. Further, in the operating system, there is a first virtual file system IO simulator M610 corresponding to the first virtual file system M69 for recognizing an operation of accessing a file of the first virtual file system M69.

The first file simulator M61 forwards the file access request to the first file manager M6C, and the first file manager M6C queries a file stream instance to forward the file access request to the first incremental data manager M62 via a channel corresponding to the query; it is judged by the first incremental data manager M62 whether the file access request is a read request or a write request; when the first incremental data manager M62 determines that the file access request is a read request, the read request is sent to the first stream splitter M64; after the first stream splitter M64 receives the read request, it is firstly judged, via the first channel, whether first data corresponding to the read request exists in the locally stored launch image package; wherein such first data exists, it is judged whether the first data is valid; if the first data is valid, the first data may be acquired from the local launch image package M68 via the first channel. If the first data does not exist in the locally stored launch image package M68, or the state of the first data in the local launch image package is invalid, the first stream splitter may acquire the first data from an original image package M67 in the server via the second channel. If a part of the first data existing in the locally stored launch image package is valid, data of the valid part of the first data is acquired from the launch image package, and then data of the other part of the first data is acquired from the original image package M67 on the data server SE2.

Step 606: feeding back the first data to the target application via the third channel to cause the target application to run.

The first stream splitter M64 returns the acquired first data to the first incremental data manager M62, and the first incremental data manager M62 then forwards the first data to the first file simulator M61 via the first file manager M6C; the first file simulator M61 returns the first data to the first virtual file system M69 via the corresponding third channel S3, and the first virtual file system M69 feeds back the first data to the target application via the first virtual file system IO simulator M610.

In an embodiment of the present disclosure, when the user uses a target application for the first time, a launch running package and a launch image package of the target application are acquired; and then when the application is launched by means of the launch running package, the local cache manager acquires a file access request via the established third channel; when the file access request is a read request, the local cache manager acquires first data for the read request from the launch image package via the first channel; and/or the local cache manager acquires first data for the read request from an original image package on the server via the second channel; and then the first data is fed back to the target application via the third channel to cause the target application to run; thus, in a case where only the launch running package and the launch image package are acquired, data required by the target application is enabled to be acquired from the launch image package and/or from the original image package on the server during the running of the target application to ensure the normal running of the target application. In addition, since the launch image package contains the launch data about the target application, which is much smaller than original data about the target application, the time required for the user to launch the target application for the first time is greatly shortened, and the user experience is enhanced. In addition, while the target application is running for a long time, in general not all functions will be used, thus only part of the program data will be downloaded, so that the occupied space of the storage system of the user's local device will be greatly reduced. Moreover, since different types of files are stored in different data sets in the original data package and the launch image package of the target application, different types of data can be optimally transmitted via channels corresponding to the data during the running of the target application, for example, the transmission order is adjusted in accordance with weight priority and different compression algorithms are used to increase the data transmission efficiency and enhance the response speed of the target application in a relatively harsh network environment, thereby greatly increasing the smoothness of running of the target application and improving the adaptability to a harsh environment.

Figure 7:
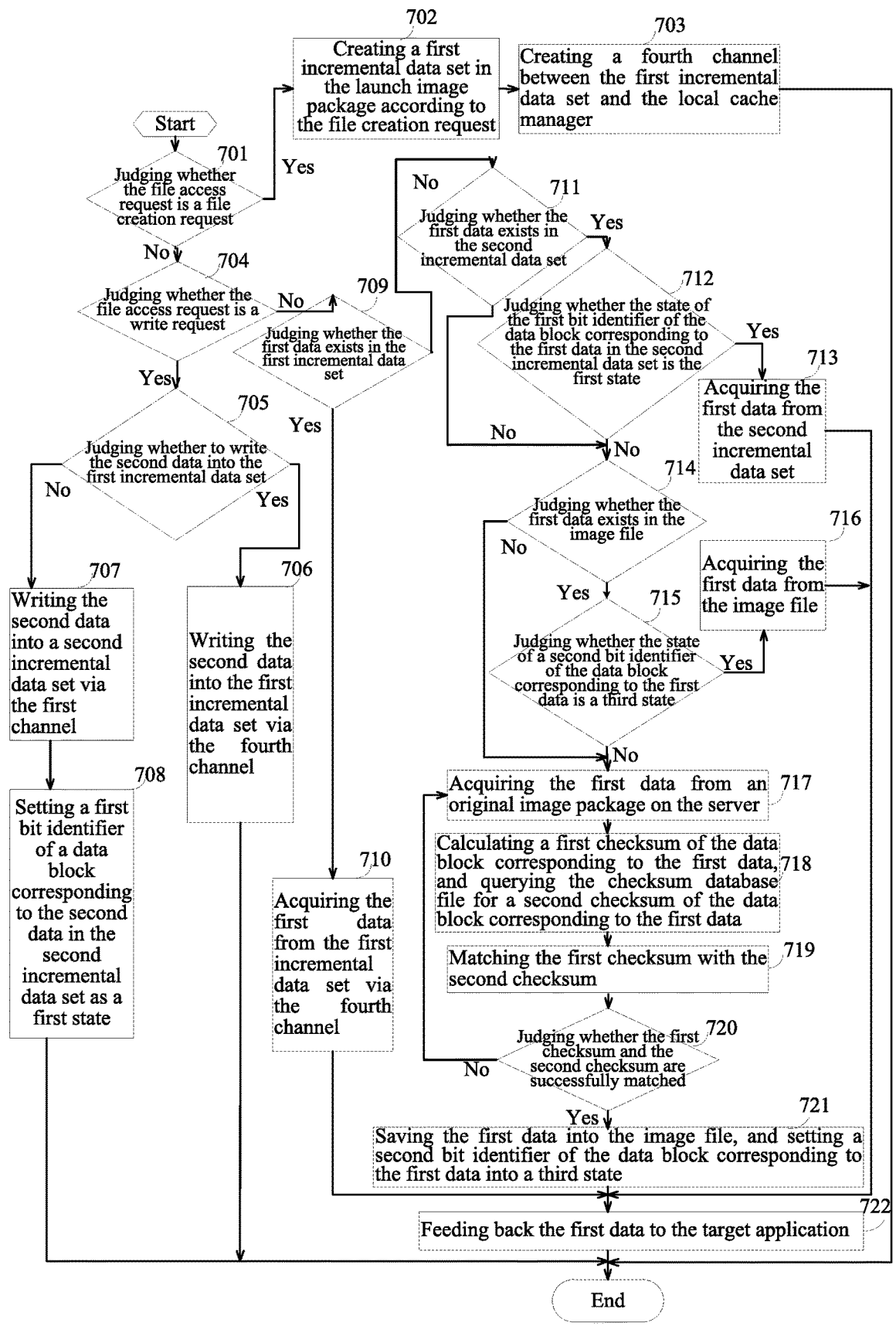
FIG. 7 is a flow chart showing the steps of another embodiment of a method for running an application according to the present disclosure.

In another embodiment of the present disclosure, the processing procedure after the first incremental data manager M62 acquires the file access request is described in detail with particular reference to FIGS. 7 and 6B, wherein FIG. 7 illustrates a flowchart showing the steps of another embodiment of a method for running an application according to the present disclosure.

In an embodiment of the present disclosure, the establishment of the first channel includes establishing a channel S1A between an image file of the basic data set and the first file manager M6C by means of the first incremental data manager M62, the first image cache manager M63, and the first stream splitter M64, and establishing a channel S1B between a second incremental data set of the basic data set and the first incremental data manager M62 so that the first incremental data manager M62 writes data into the second incremental data set in the basic data set in the launch image package M68. It can be seen that the first channel correspond to each basic data set in the launch image package, respectively.

Step 701: judging whether the file access request is a file creation request, wherein when the file access request is a file creation request, executing step 702; and when the file access request is not a file creation request, executing step 704.

During running of the target application, the target application needs to read the data in the launch image package to ensure the normal running of the target application, and additionally needs to save data modified or newly added by the system, such as a change in character model, newly added user information, or the like, to the local launch image package based on the operation of the system, therefore the target application sends a file access request to the first virtual file system M69 during running of the target application, wherein the file access request includes: a file creation request, a write request, or a read request; after the local cache manager M6 receives the request, a corresponding processing mode will be different for a different request. When the file access request is a file creation request, the first incremental data manager M62 may create a first incremental data set in the launch image package M68, that is to say, step 702 is executed. When the file access request received by the first incremental data manager M62 is a write request, in order not to destroy the data in the launch image package M68 that supports the normal running of the target application, the first incremental data manager M62 may write data corresponding to the write request into a second incremental data set of the launch image package M68, or write the data corresponding to the write request into the first incremental data set. When the file access request is a read request, the first incremental data manager M62 may send the read request to the first stream splitter M64, and the first stream splitter M64 reads corresponding data from the launch image package M68 and/or from the original image package M67, that is to say, step 709 to step 722 are executed.

Step 702: creating, according to the file creation request, a first incremental data set in the launch image package.

Step 703: creating a fourth channel between the first incremental data set and the local cache manager, and then executing an ending step.

When the first virtual file system M69 receives a file creation request from the target application, a file descriptor of the corresponding file is created in the first virtual file system M69, and a channel between the file descriptor of the file and the first file simulator M61 is created; and then the file creation request is forwarded to the first file simulator M61 via the channel. The first file simulator M61 sends the file creation request to the first incremental data manager M62 via the first file manager M6C; when the first incremental data manager M62 determines based on the file creation request that an incremental data set needs to be created, a first incremental data set is created in the launch image package M68, and then a fourth channel S4 between the first incremental data set and the local cache manager M6 is created, wherein the fourth channel is configured to write second data corresponding to the write request into the first incremental data set, and to read out first data corresponding to the read request from the first incremental data set; wherein each first incremental data set in the launch image package respectively corresponds to a fourth channel. In addition, each first incremental data set further comprises an attribute description block file for describing attributes of the first incremental data set, and corresponding parameters in the attribute description block file are updated each time the second data is written.

Step 704: judging whether the file access request is a write request; wherein when the file access request is a write request, executing step 705; and when the file access request is not a write request, executing step 709.

Step 705: judging whether to write the second data into the first incremental data set, wherein when the second data is to be written into the first incremental data set, executing step 706; and when the second data is not to be written into the first incremental data set, executing step 707.

When the first incremental data manager M62 determines that the file access request is a write request, data corresponding to the write request is determined as second data; if the data content corresponding to the write request falls within the data range of a file corresponding to the basic data set, the first incremental data manager M62 reads a data block corresponding to the second data from the basic data set of the launch image package and/or from the data set of the original image package on the server via the first channel, and places the data block corresponding to the second data in a memory; otherwise, an empty memory data block having an identical size to the data block corresponding to the second data is directly allocated in the memory, and the first incremental data manager M62 updates, based on the write request, the memory data block corresponding to the data block corresponding to the second data. The launch image package M68 contains two types of incremental data sets, i.e., first incremental data set and second incremental data set; therefore, after the update of the second data is completed, it is necessary to judge into which incremental data set the second data is to be written; when it is determined that the second data needs to be written into the first incremental data set, step 706 is executed; otherwise, step 707 is executed.

Step 706: writing the second data into the first incremental data set via the fourth channel, and then executing an ending step.

When it is determined that the second data needs to be written into the first incremental data set, the second data is written into the first incremental data set via the fourth channel between the first incremental data set and the first incremental data manager M62.

Step 707: writing the second data into a corresponding second incremental data set via the first channel.

When it is determined that the second data needs to be written into a second incremental data set, the second data is written into the second incremental data set via the first channel between the second incremental data set and the first incremental data manager M62.

Step 708: setting a first bit identifier of a data block corresponding to the second data in the second incremental data set as a first state, and then executing an ending step.

When the first incremental data manager M62 updates a data block corresponding to the second data, it may be successfully updated, or may be updated unsuccessfully; when it is determined that the second data is to be written into the first incremental data set, only a data block corresponding to the second data that is successfully updated is written into the first incremental data set; and when it is determined that the second data is to be written into the second incremental data set, both the successfully updated data and the unsuccessfully updated data are written into the second incremental data set; and a first bit identifier of the successfully updated data block is set as a first state such as 1; and a first bit identifier of the unsuccessfully updated data block is set as a second state such as 0. Here, the first bit identifier is an identifier of a data block of the second incremental data set, the first state is a state in which the data block is updated successfully, and the second state is a state in which the data block is not updated successfully.

When the first incremental data manager M62 determines that the file access request is a read request, the read request is sent to the first stream splitter M64; the first stream splitter M64 may acquire data corresponding to the read request from the local launch image package M68 and/or from the data server SE2; specifically, the acquisition of first data from the local launch image package M68 by the first incremental data manager M62 includes: acquiring the first data from the basic data set of the launch image package M68, or acquiring the first data from the first incremental data set; and acquisition of the first data from the basic data set includes acquiring the first data from the image file and/or from the second incremental data set. The specific steps are performed as follows:

Step 709: judging whether the first data exists in the first incremental data set; wherein when the first data exists in the first incremental data set, executing step 710, and when the first data does not exist in the first incremental data set, executing step 711.

Step 710: acquiring a data block corresponding to the first data from the first incremental data set via the fourth channel, and then executing step 722.

Data blocks corresponding to the first data may all exist in the first incremental data set, or may all exist in a basic data set of the launch image package and/or in a data set of the original image package; therefore, when the first file manager M6C receives the read request, it is judged whether all the data blocks corresponding to the first data exist in the first incremental data set, and if only part of data blocks corresponding to the first data exist in the first incremental data set, information indicating a failure is returned to the target application, and an ending step is executed; when all the data blocks corresponding to the first data exist in the first incremental data set, all the data blocks corresponding to the first data are acquired from the first incremental data set via the fourth channel.

When the first incremental data set does not have any data block corresponding to the first data, the first data may be acquired from the basic data set of the launch image package and/or from the data set of the original image package. The specific steps of acquiring the first data are performed as follows:

Step 711: judging whether the first data exists in the second incremental data set; wherein when the first data exists in the second incremental data set, executing step 712; and when the first data does not exist in the second incremental data set, executing step 714.

It is judged whether a data block corresponding to the first data exists in a second incremental data set of the basic data set of the launch image package, and if such data block exists, step 712 is executed; and when there is no data block corresponding to the first data in the second incremental data set, step 714 is executed.

Step 712: judging whether the state of the first bit identifier of the data block corresponding to the first data in the second incremental data set is the first state, wherein when the state of the first bit identifier is the first state, executing step 713; and when the state of the first bit identifier is not the first state, step 714 is executed.

When there is a data block corresponding to the first data in the second incremental data set, it is determined, based on a first bit identifier corresponding to the data block in the second incremental data set, whether the data block corresponding to the first data is successfully updated. When the state of the first bit identifier of the data block is the first state, it is determined that data in the data block is successfully updated, and step 713 is performed; and when the state of the first bit identifier of the data block is a second state, it is determined that the data in the data block is not successfully updated, and step 714 is executed. There may be one or more data blocks corresponding to the first data; and the first data may include all the data of each data block, or may be part of the data of each data block.

Step 713: acquiring the first data from the second incremental data set, and then executing step 722.

When the state of the first bit identifier is the first state, the first data is acquired from the second incremental data set. Since the first data may include a plurality of data blocks, when several data blocks of the plurality of data blocks included in the first data each have a first bit identifier in the first state in the respective second incremental data set, data of these several data blocks is acquired from the second incremental data set; and step 714 is executed on the other several data blocks having a first bit identifier in a second state.

When the state of the first bit identifier is the second state, the first data is read from an image file of the basic data set. The specific steps are performed as follows:

Step 714: judging whether the first data exists in an image file of the basic data set, wherein when the first data exists in the image file of the basic data set, executing step 715, and when the first data does not exist in the image file of the basic data set, executing step 717.

Before reading the first data from the image file, the first stream splitter M64 needs to firstly judge whether the first data exists in the image file, if the first data exists, step 715 is executed, and if the first data does not exist, step 717 is executed.

Step 715: judging whether the state of a second bit identifier of the data block corresponding to the first data is a third state, wherein when the state of a second bit identifier is the third state, executing step 716; and when the state of a second bit identifier is not the third state, executing step 717.

When the data block corresponding to the first data exists in the image file, it is necessary to judge whether data in the data block corresponding to the first data is valid, so as to ensure that the first data to be fed back to the target application can support the normal running of the target application. Specifically, it may be judged, based on the state of the second bit identifier of the data block in the image file, whether the data block corresponding to the first data in the image file is valid; wherein when the state of the second bit identifier is a third state, the data in the corresponding data block is determined to be valid; and when the state of the second bit identifier is a fourth state, the data in the corresponding data block is determined to be invalid.

Step 716: acquiring the first data from the image file, and then executing step 722.

When the state of the second bit identifier corresponding to the data block is a third state, the first data is acquired from the image file. Since the first data may include a plurality of data blocks, when several data blocks of the plurality of data blocks included in the first data each have a second bit identifier in a third state in the image file, data of these several data blocks is acquired from the image file; and step 717 is executed on the other several data blocks having a second bit identifier in a fourth state.

Step 717: acquiring the first data from an original image package on the server.

When the first stream splitter M64 determines that the first data does not exist or a part of the first data exists in the basic data set of the launch image package M68 in the local cache of the mobile terminal, or the first data is invalid, the first data may be acquired from the original image package M67 on the data server SE2.

Step 718: calculating a first checksum of the data block corresponding to the first data, and querying the checksum database file for a second checksum of the data block corresponding to the first data.

Step 719: matching the first checksum with the second checksum.

The first data acquired from the server may be incorrect or incomplete due to network instability or other factors; after the first data is acquired from the original image package M67 on the data server, the first stream splitter M64 needs to check the acquired first data to judge whether the first data acquired from the data server is correct; therefore, a first checksum of the data block corresponding to the acquired first data is calculated; and a second checksum of the data block corresponding to the first data is searched in a checksum database file of the launch image package M68. The first checksum is matched with the second checksum, and it is judged, based on the result of the matching, whether the first data acquired from the original image package M67 is correct.

Step 720: judging whether the first checksum and the second checksum are successfully matched, wherein when the first checksum and the second checksum are successfully matched, executing step 721, and when the first checksum and the second checksum are unsuccessfully matched, executing step 717.

It is judged whether the first checksum and the second checksum are successfully matched, if they are successfully matched, step 721 may be executed, and if they are matched unsuccessfully, it is necessary to execute step 717, that is to say, the first data is to be acquired from the server again, and if the first checksum of the first data acquired from the server is not successfully matched with the second checksum for multiple times, information indicating a failure is returned to the target application, and an ending step is executed.

Step 721: saving the first data into the image file, and setting a second bit identifier of the data block corresponding to the first data into a third state.

Before returning the acquired first data to the first incremental data manager M62, the first stream splitter M64 saves the first data into the image file of the basic data set, and sets a second bit identifier of the data block corresponding to the first data into a valid state, i.e., the third state.

Step 722: feeding back the first data to the target application.

The first stream splitter M64 returns the first data to the first incremental data manager M62 via a channel corresponding to the first data either after acquiring the first data from the launch image package M68 or after acquiring the first data from the original image package; the first incremental data manager M62 returns the first data to the first file manager M6C, and the first file manager M6C sends the acquired first data to the first file simulator M61; and the first file simulator M61 feeds back the first data corresponding to the read request to the target application via the third channel S3.

Preferably, in an embodiment of the present disclosure, the server SE comprises a configuration server SE1 and a data server SE2, wherein the configuration server SE1 and the data server SE2 are connected to the original image package M67, respectively; therefore, a channel S21 between the local cache manager M6 and the configuration server SE1, and a channel S22 between the local cache manager M6 and the data server SE2 can be established, respectively; each data set contained in the original image package respectively corresponds to a channel S22, wherein the configuration server SE1 stores configuration information related to the original image package, and the data server SE2 stores data in the original image package that supports the launching and running of the target application, thus it can be seen that each channel S22 is corresponding to the respective data set in the original image package.

Preferably, in an embodiment of the present disclosure, before the first channel is established, the specific step includes: the first application manager M6A searching a local cache, based on an identifier of the target application corresponding to the launch running package M65, for a launch image package M68 corresponding to the identifier of the target application and acquiring configuration information in the launch image package after the launch image package corresponding to the target application is determined; matching the configuration information with configuration information acquired from the configuration server SE1 to determine whether the launch image package M68 found locally by the first application manager M6A is correct. When it is determined that the found launch image package is correct, a first channel between the local cache manager M6 and the launch image package M68 may be established, wherein each basic data set in the launch image package corresponds to a first channel; and the specific manner is the same as the above step 402 and will not be described in detail here.

In an embodiment of the present disclosure, relevant data such as the first data, the second data, or the like may be implemented in a form of a collection of data blocks with a fixed size (8 KB, 16 KB, 64 KB, or the like), or may be implemented in a form of a data range, and for example, a data descriptor is established to record a data start offset and a data size to describe a range corresponding to the data.

In an embodiment of the present disclosure, if the target application needs to be upgraded, it is only necessary to copy all the data that needs to be upgraded in the target application into an upgrade original image package in accordance with the procedures of generating the original image package M27 in the above embodiment; and then an upgrade launch image package of the upgraded data is made in accordance with the procedures of generating the launch image package M48 of the target application described above; when the user selects to upgrade on a mobile terminal, the mobile terminal only needs to download the upgrade launch image package directly from the server; when the target application is launched, in addition to the establishment of the above-mentioned data channels, a seventh channel between the local cache manager and the upgrade launch image package is established; and an eighth channel between the local cache manager and the upgrade original image package in the server is established; during the running of the target application, if the file access request is a read request, data corresponding to the read request is firstly acquired from the local upgrade launch image package and/or upgrade original image package; when the local cache manager fails to acquire corresponding data or only acquires partial data from the upgrade launch image package and/or the upgrade original image package, the corresponding data is acquired from the local launch image package and/or original image package. Specifically, the step of acquiring the corresponding data from the local upgrade launch image package and/or upgrade original image package is the same as the step described above, and will not be described in detail here.

If the target application will be upgraded subsequently for many times, an upgrade original image package may be generated from all the upgrade original data, or all the upgrade data may be combined with the original data, and the combined data package is used as an original data package, and then an original image package and a launch image package are remade.

Preferably, since the original data package of the target application contains a relatively large number of files, a relatively large number of channels are established on the terminal; therefore, in the subsequent generation procedures, the files of the same file type in the original data package may be integrated into one file to reduce the number of channels on the terminal during running of the target application.

Various large applications, such as online games, may utilize the system and the method for running an application according to the embodiments of the present disclosure, and may be launched and run on a mobile terminal in which the application is not installed. Taking an online game A as an example, specifically, an APP Launcher of the online game A and a launch image package of the online game A are acquired on a mobile terminal in which the online game A is not installed, wherein the launch image package only contains data for launching the online game A and data till the online game A runs to level 5; the user can launch the online game A by clicking on the APP Launcher, and when the online game A is launched, a local cache manager is established and a first virtual file system is created; and the first channel, the second channel, and the third channel described above are established; when the user registers in the online game A, the online game A sends a file creation request and a write request to the first virtual file system; when the local cache manager acquires the file creation request via the third channel, a first incremental data set is established; when the write request is received, information registered by the user is written into a second incremental data set of the launch image package, or written into the created first incremental data set; when the online game A is launched and runs to level 5, the local cache manager acquires all the data required by the online game A from the launch image package via the first channel, and feeds back the acquired data to the online game A via the third channel; when the online game A runs to level 6, the local cache manager acquires data about level 6 from the original image package on the server via the second channel, and feeds back the acquired data to the online game A via the third channel; and the data about level 6 is saved in the launch image package; thus, the generation of the launch image package of the online game A is enabled while the online game A is running. When the online game A runs to level 6 after the online game A is launched again, the local cache manager may acquire the data required for level 6 of the online game A from the local launch image package. If levels 1, 5, and 10 of the online game A are upgraded, an upgrade original image package and a corresponding upgrade launch image package can be made from the upgrade data corresponding to levels 1, 5, and 10 of the online game A; the upgrade original image package is stored on the server, and the upgrade launch image package is stored on the mobile terminal having the launch image package of the online game A; and at this time, the upgraded online game A can be run on the mobile terminal.

In an embodiment of the present disclosure, during running of the target application, on the one hand, data can be acquired from the launch image package and/or the original image package to ensure the normal running of the target application; and on the other hand, the data acquired from the original image package can be saved in the launch image package, so that the data can be directly acquired from the launch image package in the local cache when the data is required in the next running of the target application, and the smooth running of the target application is ensured. In addition, when the target application is to be upgraded, it is only necessary to acquire the upgrade original image package and the upgrade launch image package, and the upgrade of the target application can be completed when the target application is running, whereby the efficiency of upgrading the target application is greatly increased, and the cost is saved.

The various embodiments in the present specification are described in a progressive manner, each embodiment focuses on differences from other embodiments, and the same or similar parts between the various embodiments may be understood with reference to each other.

It should be noted that method embodiments are all expressed as a combination of a series of actions for the sake of simple description, but those skilled in the art will appreciate that the embodiments of the present disclosure are not limited to the described action sequence, as certain steps may be performed in other sequences or simultaneously according to the embodiments of the present disclosure. Furthermore, those skilled in the art will also appreciate that the embodiments described in the specification are all preferred embodiments, and the actions involved are not necessarily required in the embodiments of the present disclosure.

The various embodiments in the present specification are described in a progressive manner, each embodiment focuses on differences from other embodiments, and the same or similar parts between the various embodiments may be understood with reference to each other.

It will be apparent to those skilled in the art that the embodiments of the present disclosure may be provided as a method, apparatus, or computer program product. Therefore, the embodiments of the present disclosure may take the form of an entirely hardware embodiment, an entirely software embodiment, or an embodiment in which software and hardware are combined. Moreover, embodiments of the present disclosure may take the form of a computer program product embodied on one or more computer usable storage media (including but not limited to a disk storage, CD-ROM, an optical storage, or the like) containing computer usable program codes.

Figure 8:
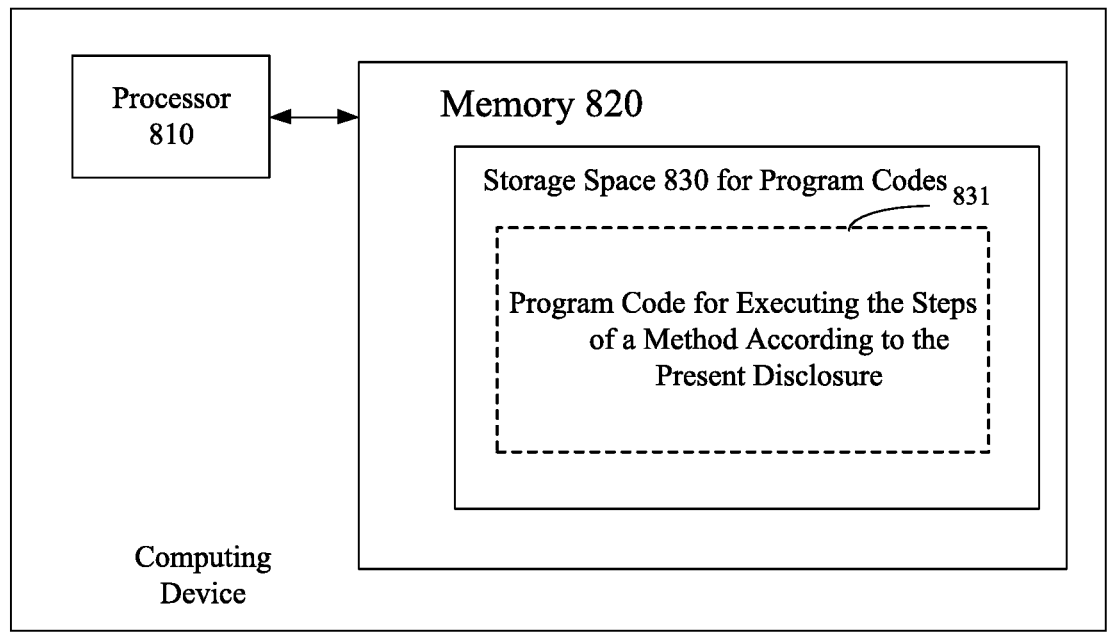
FIG. 8 is a block diagram of a computing device for executing methods of generating an image package and running an application according to the present disclosure.
Figure 9:
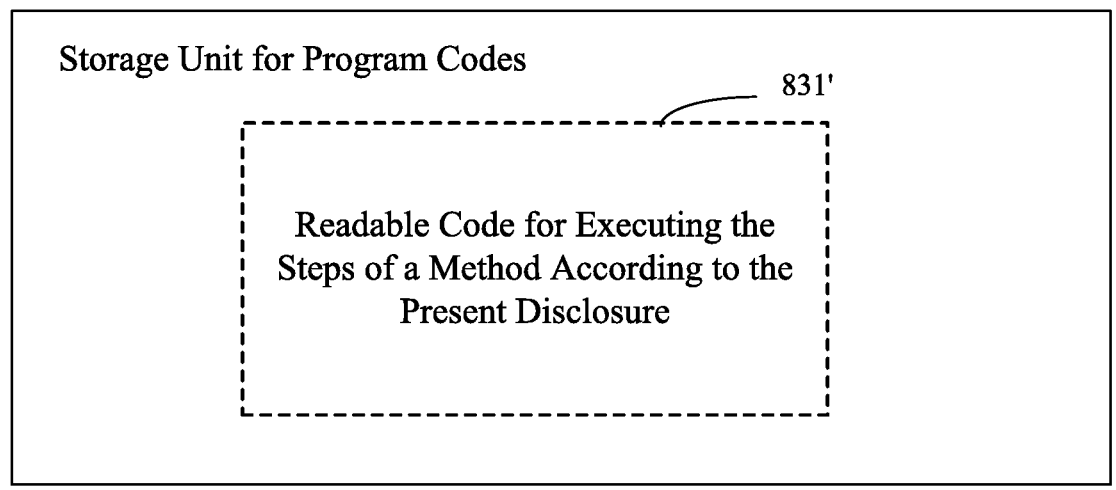
FIG. 9 is a storage unit for maintaining or carrying program codes implementing methods of generating an image package and running an application according to the present disclosure.

For example, FIG. 8 illustrates a computing device that can implement the methods of generating an image package and running an application according to the present disclosure, the computing device including: a computing device for a method of generating an original image package, and a computing device for a method of generating a launch image package, and a computing device for a method of running an application. The computing device conventionally comprises a processor 810 and a program product or readable medium in the form of a memory 820. The memory 820 may be an electronic memory such as a flash memory, EEPROM (electrically erasable programmable read-only memory), EPROM, or ROM. The memory 820 has a storage space 830 for program codes 831 for executing any of the method steps of the methods described above. For example, the storage space 830 for program codes may comprise various program codes 831 for implementing various steps in the above methods, respectively. These program codes may be read from one or more program products or written into one or more program products. These program products include program code carriers such as memory cards. Such a program product is typically a portable or fixed storage unit as described with reference to FIG. 9. The storage unit may have a storage segment, a storage space, or the like arranged similarly to the memory 820 in the computing device in FIG. 8. The program code may be compressed, for example, in an appropriate form. Typically, the storage unit comprises readable codes 831', i.e., codes readable by a processor such as 810, and these codes, when being run by a computing device, cause the computing device to execute various steps in the methods described above.

Those of ordinary skill in the art can understand that the implementation of all or some of the steps of the methods of the foregoing embodiments may be carried out by instructing related hardware using a program, and the program may be stored in a computer readable storage medium, such as a ROM/RAM, a magnetic disk, an optical disk, or the like.

The embodiments of the present disclosure are described with reference to flowchart illustrations and/or block diagrams of methods, terminal devices (systems), and computer program products according to embodiments of the present disclosure. It will be understood that each procedure and/or block of the flowchart illustrations and/or block diagrams, and combinations of procedures and/or blocks in the flowchart illustrations and/or block diagrams, can be implemented by computer program instructions. These computer program instructions may be provided to a processor of a general purpose computer, special purpose computer, or other programmable data processing terminal device to create a machine, such that the instructions, which are executed via the processor of the computer or other programmable data processing terminal device, create means for implementing the functions specified in the flowchart and/or block diagram block or blocks.

These computer program instructions may also be stored in a computer-readable memory that can direct a computer or other programmable data processing terminal device to function in a particular manner, such that the instruction stored in the computer-readable memory make an article of manufacture including instruction means which implement the functions specified in the flowchart and/or block diagram block or blocks.

These computer program instructions may also be loaded onto a computer or other programmable data processing terminal device to cause a series of operational steps to be executed on the computer or other programmable terminal device to make a processing implemented by a computer, so that the instructions executed on the computer or other programmable terminal device provide steps for implementing the functions specified in the flowchart and/or block diagram block or blocks.

While preferred embodiments of the embodiments of the present disclosure have been described, additional variations and modifications may be made to these embodiments once the basic inventive concept is known to those skilled in the art. Accordingly, the appended claims are intended to be construed to include the preferred embodiments and all the variations and modifications falling within the scope of the embodiments of the present disclosure.

Finally, it should also be noted that in this text, relation terms such as first, second, and the like are used only for distinguishing one entity or operation from another entity or operation, while it is not necessarily required or implied that these entities or operations have any such practical relation or order. Furthermore, the terms "comprise", "include", or any variations thereof are intended to cover non-exclusive inclusions, such that a process, method, article, or terminal device that comprises a list of elements not only comprises those elements, but also comprises other elements not expressly listed or also comprises elements inherent to such process, method, article, or terminal device. Without more restrictions, an element defined with the wording "comprising a . . . " does not exclude the presence of additional identical elements in the process, method, article or terminal device comprising said element.

A method for running an application and an apparatus for running an application provided in the present disclosure are described in detail above. The principles and embodiments of the present disclosure are described herein by using specific examples. The description of the above embodiments is only intended to help the understanding of the methods of the present disclosure and core concepts thereof. Moreover, it will be understood by those skilled in the art that changes may be made on specific embodiments and application scopes according to the concepts of the present disclosure. In conclusion, the description in this specification should not be construed as limiting the present disclosure.

What is claimed is:

1. A method for running an application, comprising the following steps:
   acquiring, when a target application is not installed, a launch running package and a launch image package of the target application in advance, wherein the launch running package is configured to launch the target application, and the launch image package comprises launch data about the target application;
   establishing, when the target application is launched by the launch running package, a local cache manager, and establishing at least one first channel between the local cache manager and the launch image package, and establishing at least one second channel between the local cache manager and a server;
   locally creating a first virtual file system, and establishing at least one third channel between the local cache manager and the first virtual file system;
   the local cache manager receiving a file access request via the at least one third channel respectively, wherein the file access request is received by the first virtual file system from the target application;
   the local cache manager acquiring, when the file access request is a read request, first data for the read request from the launch image package via the at least one first channel respectively; and/or the local cache manager acquiring the first data for the read request from an original image package on the server via the at least one second channel respectively, wherein the original image package comprises launch data and running data about the target application; and
   feeding back the first data to the target application via the third channel to cause the target application to run,
   wherein storage directory structures of data sets in the launch image package and the original image package correspond to logic directory relations of files in an original data package of the target application, respectively; each first channel corresponds to a respective data set in the launch image package; and each second channel corresponds to a respective data set in the original image package, and
   wherein the launch image package comprises at least one basic data set, each basic data set comprises a checksum database file; and
   after the step of acquiring the first data from the original image package on the server, the method further comprises steps of:
   calculating a first checksum of a data block corresponding to the first data, and querying the checksum database file for a second checksum of the data block corresponding to the first data;
   matching the first checksum with the second checksum;
   executing the step of feeding back the first data to the target application in a case where the first checksum and the second checksum are successfully matched; and
   executing a step of acquiring the first data from the original image package on the server in a case where the first checksum and the second checksum are not successfully matched.

2. The method according to claim 1, wherein when the local cache manager receives a file creation request, the method further comprises the following steps:
   creating, according to the file creation request, a first incremental data set in the launch image package; and
   creating a fourth channel between the first incremental data set and the local cache manager.

3. The method according to claim 2, wherein each basic data set comprises a second incremental data set; and when the file access request is a write request, the method further comprises the following steps:

writing second data corresponding to the write request into a corresponding second incremental data set via the at least one first channel respectively, and setting a first bit identifier of a data block corresponding to the second data in the second incremental data set as a first state; or writing the second data corresponding to the write request into the first incremental data set via the fourth channel.

4. The method according to claim 2, wherein the launch image package comprises the first incremental data set, and the step of the local cache manager acquiring the first data for the read request from the launch image package via the at least one first channel respectively comprises:

the local cache manager acquiring the first data for the read request from each basic data set via the at least one first channel respectively; or acquiring the first data for the read request from each first incremental data set via the fourth channel.

5. The method according to claim 4, wherein each basic data set comprises a second incremental data set and an image file, and the step of the local cache manager acquiring the first data for the read request from the basic data set via the at least one first channel respectively comprises:

the local cache manager acquiring the first data from the second incremental data set and/or acquiring the first data from the image file via the at least one first channel respectively.

6. The method according to claim 5, wherein before the step of acquiring the first data from the second incremental data set, the method further comprises:

judging whether the first data exists in the second incremental data set, judging a state of a first bit identifier of a data block corresponding to the first data when the first data exists in the second incremental data set; and executing the step of acquiring the first data from the image file when the first data does not exist in the second incremental data set.

7. The method according to claim 6, wherein after the step of judging the state of the first bit identifier of the data block corresponding to the first data, the method further comprises:

executing the step of acquiring the first data from the second incremental data set when the state of the first bit identifier is a first state; and executing the step of acquiring the first data from the image file when the state of the first bit identifier is a second state.

8. The method according to claim 5, wherein before the step of acquiring the first data from the image file, the method further comprises:

judging whether the first data exists in the image file, judging a state of a second bit identifier of a data block corresponding to the first data when the first data exists in the image file; and executing the step of acquiring the first data from the original image package on the server when the first data does not exist in the image file.

9. The method according to claim 8, wherein after the step of judging the state of the second bit identifier of the data block corresponding to the first data, the method further comprises:

executing the step of acquiring the first data from the image file when the state of the second bit identifier is a third state; and executing the step of acquiring the first data from the original image package on the server in a case where the state of the second bit identifier is a fourth state.

10. The method according to claim 1, wherein each basic data set comprises an image file, and the method further comprises:

saving, when the first data is to be fed back to the target application, the first data into the image file and setting a second bit identifier of a data block corresponding to the first data as a third state.

11. The method according to claim 1, wherein the server comprises a configuration server, and a step of establishing a fifth channel between the local cache manager and the configuration server comprises:

acquiring an identifier of the target application; and establishing, according to the identifier, the fifth channel between the local cache manager and the configuration server, and acquiring first configuration information corresponding to the identifier.

12. The method according to claim 11, wherein the server comprises a data server, and a step of establishing a sixth channel between the local cache manager and the data server comprises:

establishing, according to the first configuration information, the sixth channel between the local cache manager and the data server.

13. The method according to claim 11, wherein the launch image package comprises a configuration file, and the configuration file comprises configuration information; and before the step of establishing the at least one first channel between the local cache manager and the launch image package, the method further comprises the following steps:

searching, according to the identifier, a local cache for a launch image package corresponding to the identifier, and searching the configuration file of the launch image package corresponding to the identifier for second configuration information;

matching the first configuration information with the second configuration information; and determining the launch image package corresponding to the identifier as a launch image package of the target application in a case where the first configuration information is successfully matched with the second configuration information.

14. The method according to claim 1, wherein each basic data set comprises an image file, and the local cache manager comprises an image cache manager;

the step of establishing the at least one first channel between the local cache manager and the launch image package comprises:

opening each image file by the image cache manager, and establishing the at least one first channel respectively between the image cache manager and the image file.

15. The method according to claim 1, wherein when the target application needs to be upgraded, the method further comprises:

acquiring an upgrade launch image package of the target application, wherein the upgrade launch image package comprises part of update data of the target application;

establishing, after the local cache manager is established, at least one seventh channel between the local cache manager and the upgrade launch image package and establishing at least one eighth channel between the local cache manager and the server; and the local cache manager acquiring the first data for the read request from the upgrade launch image package via the at least one seventh channel respectively; and/or the local cache manager acquiring the first data for the read request from an upgrade original image package on the server via the at least one eighth channel respectively before acquiring the first data from the image package and/or the original image package, wherein the upgrade original image package comprises all the update data of the target application, wherein storage directory structures of data sets in the upgrade launch image package and the upgrade original image package correspond to logic directory relations of files in an original upgrade data package of the target application, respectively; the at least one seventh channel respectively corresponds to each data set in the upgrade launch image package; and the at least one eighth channel respectively corresponds to each data set in the upgrade original image package.

16. A program, comprising readable codes, wherein when the program is executed on a computing device, the computing device executes the method for running the application according to claim 1.

17. A non-transitory computer-readable medium, storing the program according to claim 16.

18. A method for generating a launch image package of an application, comprising steps of:

establishing, when a target application is launched, a local manager and establishing an eleventh channel between the local manager and a data set in an original image package;

copying, in accordance with a storage directory structure of the data set in the original image package, the data set in the original image package into the launch image package, determining a data set in the launch image package as a basic data set, and establishing a twelfth channel between the local manager and the basic data set, wherein an image file of the basic data set is empty;

locally creating a third virtual file system and establishing at least one thirteenth channel between the local manager and the third virtual file system;

the local manager receiving a file access request via the at least one thirteenth channel respectively, wherein the file access request is received by the third virtual file system from the target application; and the local manager acquiring, when the file access request is a read request, fourth data corresponding to the read request from the original image package via the eleventh channel; and writing the fourth data into the image file of the basic data set via the twelfth channel; and stopping writing the fourth data into the image file of the basic data set when the target application stops running, wherein the twelfth channel corresponds to the basic data set in the launch image package; and the eleventh channel corresponds to the data set in the original image package.

19. The method according to claim 18, wherein an amount of data of the launch image package is less than 5% of an amount of data of the original image package.

20. A program, comprising a readable code, wherein when the program is executed on a computing device, the computing device executes the method for generating the launch image package of the application according to claim 18.

21. A non-transitory computer-readable medium, storing the program according to claim 20.

22. A system for running an application, comprising:

a data package acquiring module configured to acquire a launch running package and a launch image package of a target application in advance when the target application is not installed, wherein the launch running package is configured to launch the target application, and the launch image package comprises launch data about the target application;

a local cache manager establishing module configured to establish a local cache manager, establish at least one first channel between the local cache manager and the launch image package, and establish at least one second channel between the local cache manager and a server when the target application is launched by the launch running package;

a first virtual file system establishing module which locally creates a first virtual file system, and establishes at least one third channel between the local cache manager and the first virtual file system;

a first file access request receiving module configured to invoke the local cache manager to receive a file access request via the at least one third channel respectively, wherein the file access request is received by the first virtual file system from the target application;

a data acquiring module configured to invoke, when the file access request is a read request, the local cache manager to acquire first data for the read request from the launch image package via the at least one first channel respectively; and/or invoke the local cache manager to acquire the first data for the read request from an original image package on the server via the at least one second channel respectively, wherein the original image package comprises launch data and running data about the target application; and a data feedback module configured to feed back the first data to the target application via the third channel to cause the target application to run, wherein storage directory structures of data sets in the launch image package and the original image package correspond to logic directory relations of files in an original data package of the target application, respectively; the at least one first channel respectively corresponds to each data set in the launch image package; and the at least one second channel respectively corresponds to each data set in the original image package, the system further comprising:

a data upgrading module configured to acquire an upgrade launch image package of the target application when the target application needs to be upgraded, wherein the upgrade launch image package comprises part of update data of the target application; after the local cache manager is established, at least one seventh channel between the local cache manager and the upgrade launch image package is established, and at least one eighth channel between the local cache manager and the server is established; before acquiring the first data from the launch image package and/or the original image package, the local cache manager acquires the first data for the read request from the upgrade launch image package via the at least one seventh channel respectively; and/or, the local cache manager acquires the first data for the read request from an upgrade original image package on the server via the at least one eighth channel respectively, wherein the upgrade original image package comprises all the update data of the target application, wherein storage directory structures of data sets in the upgrade launch image package and the upgrade original image package correspond to logic directory relations of files in an original upgrade data package of the target application, respectively; the at least one seventh channel respectively corresponds to each data set in the upgrade launch image package; and the at least one eighth channel respectively corresponds to each data set in the upgrade original image package.

23. The system for running an application according to claim 22, further comprising:
a file creating module configured to create, when the local cache manager receives a file creation request, a first incremental data set in the launch image package according to the file creation request; and create a fourth channel between the first incremental data set and the local cache manager.

24. The system for running an application according to claim 23, further comprising:
a data writing module configured to write, when the file access request is a write request, second data corresponding to the write request into a corresponding second incremental data set via the at least one first channel respectively, and to set a first bit identifier of a data block corresponding to the second data in the second incremental data set as a first state; or to write the second data corresponding to the write request into the first incremental data set via the fourth channel.

25. A system for generating a launch image package of an application, comprising:
a local manager establishing module configured to establish a local manager and establish an eleventh channel between the local manager and a data set in an original image package when a target application is launched;
a launch image package data set copying module configured to copy the data set in the original image package into a launch image package in accordance with a storage directory structure of the data set in the original image package, and to determine a data set in the launch image package as a basic data set, and to establish a twelfth channel between the local manager and the basic data set, wherein an image file of the basic data set is empty;
a third virtual file system establishing module configured to locally create a third virtual file system and establish at least one thirteenth channel between the local manager and the third virtual file system;
a second file access request receiving module configured to invoke the local manager to receive a file access request via the at least one thirteenth channel respectively, wherein the file access request is received by the third virtual file system from the target application; and
a launch image package data writing module configured to invoke, when the file access request is a read request, the local manager to acquire fourth data corresponding to the read request from the original image package via the eleventh channel; and to write the fourth data into the image file of the basic data set via the twelfth channel; and to stop writing the fourth data into the image file of the basic data set when the target application stops running,
wherein the twelfth channel corresponds to the basic data set in the launch image package; and the eleventh channel corresponds to the data set in the original image package.

* * * * *